US012058682B2

(12) United States Patent
Yang et al.

(10) Patent No.: US 12,058,682 B2
(45) Date of Patent: Aug. 6, 2024

(54) HANDLING COLLISIONS BETWEEN A FEEDBACK MESSAGE AND UPLINK CONTROL INFORMATION

(71) Applicant: QUALCOMM Incorporated, San Diego, CA (US)

(72) Inventors: Wei Yang, San Diego, CA (US); Seyedkianoush Hosseini, San Diego, CA (US); Seyed Ali Akbar Fakoorian, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 463 days.

(21) Appl. No.: 17/226,829

(22) Filed: Apr. 9, 2021

(65) Prior Publication Data

US 2021/0337574 A1   Oct. 28, 2021

Related U.S. Application Data

(60) Provisional application No. 63/023,131, filed on May 11, 2020, provisional application No. 63/014,642, filed on Apr. 23, 2020.

(51) Int. Cl.
*H04W 72/12* (2023.01)
*H04B 7/06* (2006.01)
(Continued)

(52) U.S. Cl.
CPC .......... *H04W 72/21* (2023.01); *H04B 7/0626* (2013.01); *H04L 1/1896* (2013.01); *H04W 72/0446* (2013.01); *H04W 72/535* (2023.01)

(58) Field of Classification Search
CPC ............... H04W 72/21; H04W 72/535; H04W 72/0446; H04B 7/0626; H04L 1/1896; H04L 1/0026; H04L 1/1671; H04L 1/1854

See application file for complete search history.

(56) References Cited

U.S. PATENT DOCUMENTS

2018/0110042 A1   4/2018   Chen et al.
2019/0007248 A1*  1/2019   Takeda .................. H04L 5/0053
(Continued)

OTHER PUBLICATIONS

CATT: "Multiplexing of UCI Transmissions of Different Durations or Configurations", 3GPP Draft, 3GPP TSG RAN WG1 Meeting #92, R1-1801731, 3rd Generation Partnership Project (3GPP), Mobile Competence Centre, 650, Route Des Lucioles, F-06921 Sophia-Antipolis Cedex, France, vol. RAN WG1, No. Athens, Greece, Feb. 26, 2018-Mar. 2, 2018 Feb. 17, 2018 (Feb. 17, 2018), XP051397712, 9 Pages, Retrieved from the Internet: URL:http://www.3gpp.org/ftp/tsg%5Fran/WG1%5FRL1/TSGR1%5F92/Docs/ [retrieved on Feb. 17, 2018] Section 2, Section 2.1.

(Continued)

*Primary Examiner* — Awet Haile
(74) *Attorney, Agent, or Firm* — Holland & Hart LLP

(57) ABSTRACT

Methods, systems, and devices for wireless communications are described. A user equipment (UE) may receive scheduling information for transmitting uplink control information in a first resource, where the first resource spans at least portions of a set of transmission time intervals. The UE may receive downlink data to be acknowledged via a feedback message in a second resource, where the second resource is within one of the set of transmission time intervals. The UE may identify that the first resource overlaps in time with the second resource. The UE may determine a transmission resource for the feedback message based on the first resource overlapping the second resource, the first resource spanning at least portions of the set of transmission time intervals, and the second resource being within one of the set of transmission time intervals. The UE may transmit feedback message via the transmission resource.

29 Claims, 16 Drawing Sheets

(51) Int. Cl.
  *H04L 1/1867* (2023.01)
  *H04W 72/04* (2023.01)
  *H04W 72/0446* (2023.01)
  *H04W 72/21* (2023.01)
  *H04W 72/50* (2023.01)

(56) References Cited

U.S. PATENT DOCUMENTS

| | | | |
|---|---|---|---|
| 2019/0150169 A1 | 5/2019 | Wang et al. | |
| 2019/0261361 A1 | 8/2019 | Xiong et al. | |
| 2020/0145167 A1* | 5/2020 | Jung | H04L 5/0055 |
| 2021/0307048 A1* | 9/2021 | Jiang | H04W 72/0446 |
| 2022/0287029 A1* | 9/2022 | Gao | H04L 1/1896 |
| 2023/0077055 A1* | 3/2023 | Gou | H04L 5/0055 |
| 2023/0087223 A1* | 3/2023 | Jang | H04L 1/08 370/329 |
| 2023/0198677 A1* | 6/2023 | Gou | H04W 72/1268 370/329 |
| 2024/0015748 A1* | 1/2024 | Kittichokechai | H04L 1/08 |

OTHER PUBLICATIONS

International Search Report and Written Opinion—PCT/US2021/026908—ISA/EPO—Jul. 6, 2021.

\* cited by examiner

HANDLING COLLISIONS BETWEEN A FEEDBACK MESSAGE AND UPLINK CONTROL INFORMATION

CROSS REFERENCE

The present Application for Patent claims the benefit of U.S. Provisional Patent Application No. 63/014,642 by YANG et al., entitled "SOLUTION TO SOLVE COLLISION BETWEEN SUB-SLOT BASED HARQ-ACK AND SLOT-BASED CSI," filed Apr. 23, 2020, and the benefit of U.S. Provisional Patent Application No. 63/023,131 by YANG et al., entitled "HANDLING COLLISIONS BETWEEN A FEEDBACK MESSAGE AND UPLINK CONTROL INFORMATION," filed May 11, 2020, each of which is assigned to the assignee hereof, and each of which is expressly incorporated by reference herein.

FIELD OF TECHNOLOGY

The following relates generally to wireless communications and more specifically to handling collisions between a feedback message and uplink control information.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

The described techniques relate to improved methods, systems, devices, and apparatuses that support handling collisions between a feedback message and uplink control information. Generally, the described techniques provide for a user equipment (UE) to resolve overlap between a resource for a sub-slot-based feedback message (e.g., hybrid automatic repeat request (HARQ) acknowledgement (ACK) messages) and a resource for slot-based uplink control information. For instance, a base station may transmit, to a UE, scheduling information for transmitting uplink control information in a first resource, where the first resource spans at least portions of a set of transmission time intervals (e.g., sub-slots). In other words, the first resource may be slot-based, as it may span across multiple sub-slots. The base station may transmit, to the UE, a downlink data message to be acknowledged via a feedback message in a second resource, where the second resource is within one of the set of transmission time intervals (e.g., within a sub-slot). The UE may identify that the first resource overlaps in time with the second resource. The UE and base station may determine respective resources for communication of the feedback message based on the first resource overlapping the second resource, the first resource spanning at least portions of the set of transmission time intervals, and the second resource being within one of the set of transmission time intervals. The UE may transmit, to the base station, the feedback message via the determined resource.

A method for wireless communication is described. The method may include receiving scheduling information for transmitting uplink control information in a first resource, where the first resource spans at least portions of a set of transmission time intervals, receiving a downlink data message to be acknowledged via a feedback message in a second resource, where the second resource is within one of the set of transmission time intervals, identifying that the first resource overlaps in time with the second resource, determining a transmission resource for transmission of the feedback message based on the first resource overlapping the second resource, the first resource spanning at least portions of the set of transmission time intervals, and the second resource being within one of the set of transmission time intervals, and transmitting the feedback message via the transmission resource.

An apparatus for wireless communication is described. The apparatus may include a processor, memory in electronic communication with the processor, and instructions stored in the memory. The instructions may be executable by the processor to cause the apparatus to receive scheduling information for transmitting uplink control information in a first resource, where the first resource spans at least portions of a set of transmission time intervals, receive a downlink data message to be acknowledged via a feedback message in a second resource, where the second resource is within one of the set of transmission time intervals, identify that the first resource overlaps in time with the second resource, determine a transmission resource for transmission of the feedback message based on the first resource overlapping the second resource, the first resource spanning at least portions of the set of transmission time intervals, and the second resource being within one of the set of transmission time intervals, and transmit the feedback message via the transmission resource.

Another apparatus for wireless communication is described. The apparatus may include means for receiving scheduling information for transmitting uplink control information in a first resource, where the first resource spans at least portions of a set of transmission time intervals, means for receiving a downlink data message to be acknowledged via a feedback message in a second resource, where the second resource is within one of the set of transmission time intervals, means for identifying that the first resource overlaps in time with the second resource, means for determining a transmission resource for transmission of the feedback message based on the first resource overlapping the second resource, the first resource spanning at least portions of the set of transmission time intervals, and the second resource being within one of the set of transmission time intervals, and means for transmitting the feedback message via the transmission resource.

A non-transitory computer-readable medium storing code for wireless communication is described. The code may include instructions executable by a processor to receive scheduling information for transmitting uplink control information in a first resource, where the first resource spans at least portions of a set of transmission time intervals, receive a downlink data message to be acknowledged via a feedback message in a second resource, where the second resource is within one of the set of transmission time intervals, identify that the first resource overlaps in time with the second resource, determine a transmission resource for transmission of the feedback message based on the first resource overlapping the second resource, the first resource spanning at least portions of the set of transmission time intervals, and the second resource being within one of the set of transmission time intervals, and transmit the feedback message via the transmission resource.

Some examples of the method, apparatuses, and non-transitory computer-readable medium described herein may further include operations, features, means, or instructions for multiplexing the feedback message with the uplink control information, where transmitting the feedback message includes transmitting the multiplexed feedback message and uplink control information via the transmission resource.

In some examples of the method, apparatuses, and non-transitory computer-readable medium described herein, determining the transmission resource may include operations, features, means, or instructions for identifying the transmission resource from a first uplink channel resource set, where the first uplink channel resource set may be for transmitting the feedback message when the feedback message may be multiplexed with the uplink control information and may be different from a second uplink channel resource set which may be for transmitting the feedback message without the feedback message being multiplexed with the uplink control information.

In some examples of the method, apparatuses, and non-transitory computer-readable medium described herein, the first uplink channel resource set may include operations, features, means, or instructions for selecting the transmission resource from among the set of uplink channel resources based on a size of the feedback message and a size of the uplink control information.

In some examples of the method, apparatuses, and non-transitory computer-readable medium described herein, the first uplink channel resource set may include operations, features, means, or instructions for selecting the transmission resource from among the set of uplink channel resources based on the parameter.

In some examples of the method, apparatuses, and non-transitory computer-readable medium described herein, one or more uplink channel resources of the first uplink channel resource set span at least portions of a respective set of transmission time intervals, and where each uplink channel resource of the second uplink channel resource set may be within a single transmission time interval.

In some examples of the method, apparatuses, and non-transitory computer-readable medium described herein, determining the transmission resource further may include operations, features, means, or instructions for selecting the first resource as the transmission resource.

In some examples of the method, apparatuses, and non-transitory computer-readable medium described herein, determining the transmission resource further may include operations, features, means, or instructions for identifying that the transmission resource may be an uplink control channel resource configured for transmitting a first channel state information report multiplexed with a second channel state information report.

In some examples of the method, apparatuses, and non-transitory computer-readable medium described herein, the transmission resource spans at least portions of a second set of transmission time intervals.

In some examples of the method, apparatuses, and non-transitory computer-readable medium described herein, determining the transmission resource further may include operations, features, means, or instructions for selecting the transmission resource from an uplink channel resource set, where each uplink channel resource of the uplink channel resource set may have a duration equal to or less than a respective transmission time interval.

Some examples of the method, apparatuses, and non-transitory computer-readable medium described herein may further include operations, features, means, or instructions for multiplexing, on the transmission resource, the feedback message with a scheduling request of the uplink control information.

Some examples of the method, apparatuses, and non-transitory computer-readable medium described herein may further include operations, features, means, or instructions for refraining from including a channel state information report of the uplink control information with the feedback message on the transmission resource.

In some examples of the method, apparatuses, and non-transitory computer-readable medium described herein, the uplink control information may include a channel state information report available for transmission, and the uplink control information may include operations, features, means, or instructions for identifying a first subset and a second subset of the channel state information report, multiplexing the first subset with the feedback message, where transmitting the feedback message may include operations, features, means, or instructions for transmitting the multiplexed first subset and feedback message via the transmission resource, and refraining from transmitting the second subset based on each uplink channel resource of the uplink channel resource set being within the respective transmission time interval.

In some examples of the method, apparatuses, and non-transitory computer-readable medium described herein, the uplink control information includes a channel state information report, a scheduling request, or both.

A method for wireless communication is described. The method may include transmitting scheduling information for transmitting uplink control information in a first resource, where the first resource spans at least portions of a set of transmission time intervals, transmitting a downlink data message to be acknowledged via a feedback message in a second resource, where the second resource is within one of the set of transmission time intervals, determining a communication resource for reception of the feedback message based on the first resource overlapping the second resource, the first resource spanning at least portions of the set of transmission time intervals, and the second resource being within one of the set of transmission time intervals, and receiving the feedback message via the communication resource.

An apparatus for wireless communication is described. The apparatus may include a processor, memory in electronic communication with the processor, and instructions stored in the memory. The instructions may be executable by the processor to cause the apparatus to transmit scheduling information for transmitting uplink control information in a first resource, where the first resource spans at least portions of a set of transmission time intervals, transmit a downlink data message to be acknowledged via a feedback message in a second resource, where the second resource is within one of the set of transmission time intervals, determine a communication resource for reception of the feedback message based on the first resource overlapping the second resource, the first resource spanning at least portions of the set of transmission time intervals, and the second resource being within one of the set of transmission time intervals, and receive the feedback message via the communication resource.

Another apparatus for wireless communication is described. The apparatus may include means for transmitting scheduling information for transmitting uplink control information in a first resource, where the first resource spans at least portions of a set of transmission time intervals, means for transmitting a downlink data message to be acknowledged via a feedback message in a second resource, where the second resource is within one of the set of transmission time intervals, means for determining a communication resource for reception of the feedback message based on the first resource overlapping the second resource, the first resource spanning at least portions of the set of transmission time intervals, and the second resource being within one of the set of transmission time intervals, and means for receiving the feedback message via the communication resource.

A non-transitory computer-readable medium storing code for wireless communication is described. The code may include instructions executable by a processor to transmit scheduling information for transmitting uplink control information in a first resource, where the first resource spans at least portions of a set of transmission time intervals, transmit a downlink data message to be acknowledged via a feedback message in a second resource, where the second resource is within one of the set of transmission time intervals, determine a communication resource for reception of the feedback message based on the first resource overlapping the second resource, the first resource spanning at least portions of the set of transmission time intervals, and the second resource being within one of the set of transmission time intervals, and receive the feedback message via the communication resource.

In some examples of the method, apparatuses, and non-transitory computer-readable medium described herein, receiving the feedback message may include operations, features, means, or instructions for receiving the feedback message multiplexed with the uplink control information.

In some examples of the method, apparatuses, and non-transitory computer-readable medium described herein, determining the communication resource may include operations, features, means, or instructions for identifying the communication resource from a first uplink channel resource set, where the first uplink channel resource set may be for receiving the feedback message when the feedback message may be multiplexed with the uplink control information and may be different from a second uplink channel resource set which may be for receiving the feedback message without the feedback message being multiplexed with the uplink control information.

Some examples of the method, apparatuses, and non-transitory computer-readable medium described herein may further include operations, features, means, or instructions for identifying the communication resource based on a size of the feedback message and a size of the uplink control information.

In some examples of the method, apparatuses, and non-transitory computer-readable medium described herein, the first uplink channel resource set may include operations, features, means, or instructions for including, in the downlink control information, a parameter indicating that the communication resource may be to be selected from among the set of uplink channel resources, and where receiving the multiplexed feedback message and uplink control information via the communication resource may be based on the parameter.

In some examples of the method, apparatuses, and non-transitory computer-readable medium described herein, one or more uplink channel resources of the first uplink channel resource set span at least portions of a respective set of transmission time intervals, and where each uplink channel resource of the second uplink channel resource set may be within a single transmission time interval.

In some examples of the method, apparatuses, and non-transitory computer-readable medium described herein, the communication resource includes the first resource.

Some examples of the method, apparatuses, and non-transitory computer-readable medium described herein may further include operations, features, means, or instructions for identifying that the communication resource may be an uplink control channel resource configured for receiving the feedback message multiplexed with a first channel state information report and a second channel state information report.

In some examples of the method, apparatuses, and non-transitory computer-readable medium described herein, the communication resource spans at least portions of a second set of transmission time intervals.

In some examples of the method, apparatuses, and non-transitory computer-readable medium described herein, determining the communication resource further may include operations, features, means, or instructions for identifying the communication resource from an uplink channel resource set, where each uplink channel resource of the uplink channel resource set may have a duration equal to or less than a respective transmission time interval.

In some examples of the method, apparatuses, and non-transitory computer-readable medium described herein, receiving the feedback message via the communication resource may include operations, features, means, or instructions for receiving, on the communication resource, the feedback message multiplexed with a scheduling request of the uplink control information.

In some examples of the method, apparatuses, and non-transitory computer-readable medium described herein, receiving the feedback message via the communication resource may include operations, features, means, or instructions for receiving the feedback message via the communication resource without a channel state information report of the uplink control information.

Some examples of the method, apparatuses, and non-transitory computer-readable medium described herein may further include operations, features, means, or instructions for identifying a first set of channel state information processes for which to receive a first set of channel state information messages over the second resource and a second set of channel state information processes for which to receive a second set of channel state information messages over the second resource, and receiving the first set of channel state information messages multiplexed with the feedback message, where the feedback message may be not multiplexed with the second set of channel state information messages.

In some examples of the method, apparatuses, and non-transitory computer-readable medium described herein, the uplink control information includes a channel state information message, a scheduling request, or both.

DETAILED DESCRIPTION

Figure 1:
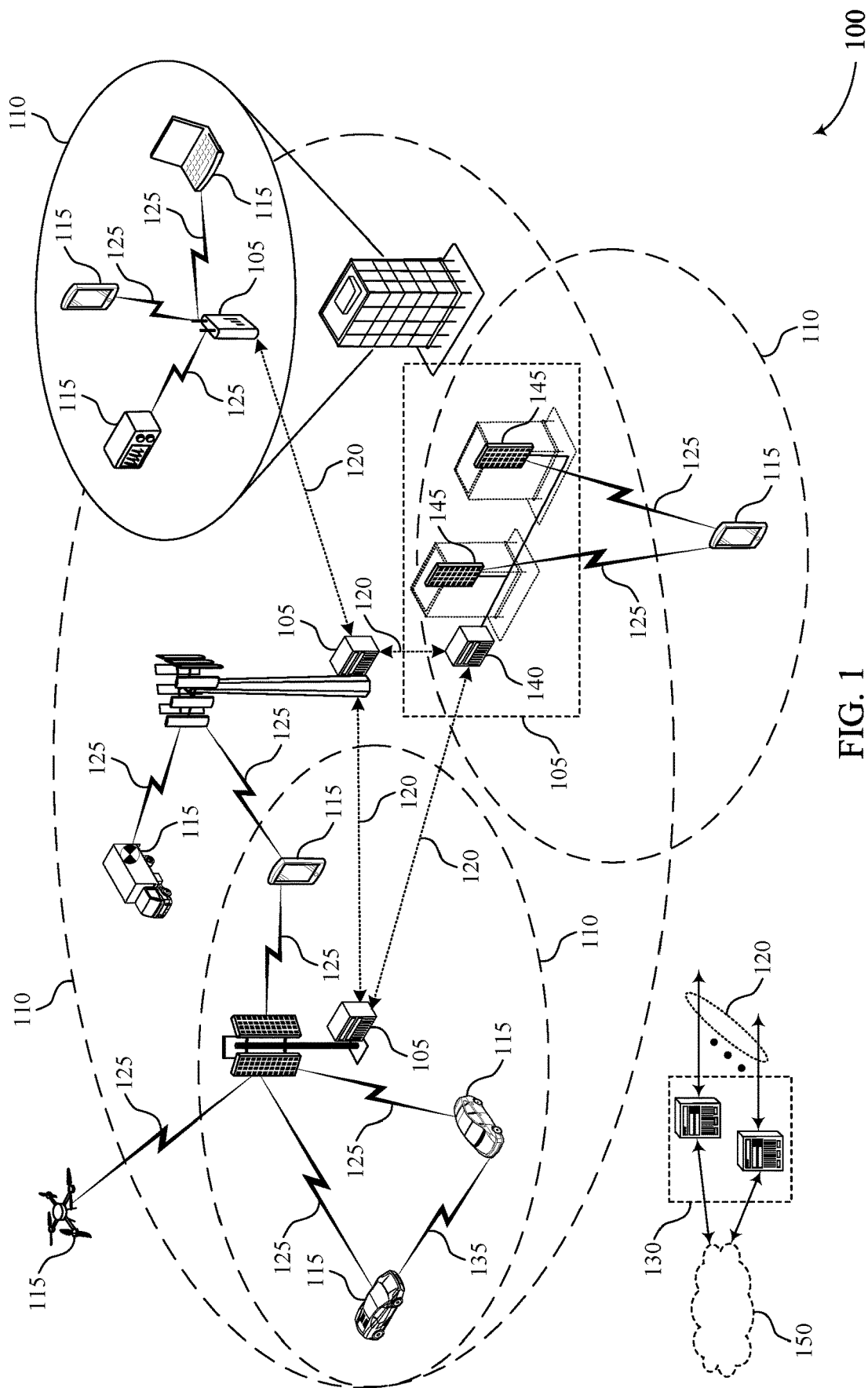
FIG. 1 illustrates an example of a wireless communications system that supports handling collisions between a feedback message and uplink control information in accordance with aspects of the present disclosure.

A user equipment (UE) may perform uplink communications with a base station, in which the UE transmits one or more uplink transmissions to the base station over one or more uplink transmission resources. In some examples, uplink transmission resources may overlap with each other. For example, an uplink resource for transmitting a feedback message (e.g., a hybrid automatic repeat request (HARQ) acknowledgement (ACK) message) from a UE may overlap (e.g., in time) with an uplink control information (UCI) message that contains other information, such as channel state information (CSI) or a scheduling request (SR). In such cases, the UE may multiplex the feedback message with the UCI and may transmit the multiplexed messages over a transmission resource (e.g., a physical uplink control channel (PUCCH) resource). In some examples, the transmission resource may be a resource for the feedback message (e.g., a HARQ-ACK resource).

In some examples, the uplink resource for transmitting the feedback message may be configured on a sub-slot level while uplink resources for transmitting the UCI may be configured on a slot level. Accordingly, the uplink resource for transmitting the feedback message may, for instance, be within a single sub-slot, whereas the uplink resource for transmitting the UCI may span multiple sub-slots. If the overlapping slot-based UCI is multiplexed with a sub-slot-based feedback message, the size of the resulting payload may be larger than what is conveyable within a single sub-slot-based resource.

The techniques as disclosed herein may be directed to methods of resolving overlap between a sub-slot-based feedback message and a slot-based UCI. In one example, the UE may be configured with a first set of transmission resources (e.g., PUCCH resources) over which the sub-slot-based feedback message may be transmitted when not overlapping with slot-based UCI and a second set of transmission resources (e.g., PUCCH resources) over which multiplexed feedback message and UCI may be transmitted when the sub-slot-based feedback message overlaps the slot-based UCI. In another example, the overlapping feedback message and UCI may be multiplexed onto a slot-based UCI resource. For instance, the UCI and feedback message may be multiplexed onto the slot-based UCI resource overlapping the sub-slot-based feedback message resource or onto another slot-based UCI resource (e.g., another slot-based UCI resource scheduled for transmission of a CSI report at a time when the UE determines the overlap).

In yet another example, the UE may drop the UCI or may multiplex the UCI with the feedback message based on a type of the UCI. For instance, if the UCI includes an SR, the UE may multiplex the SR with the feedback message on a sub-slot-based transmission resource. However, if the UCI includes CSI, the UE may drop the CSI (e.g., the UE may not multiplex the CSI with the feedback message and may not transmit the CSI over the overlapping slot-based UCI resource). Alternatively, if the UCI includes the CSI, the UE may drop a portion of the CSI and may multiplex the remaining portion with the feedback message on a sub-slot-based transmission resource. The UE may determine which portions to drop and which portions to multiplex according to a set of priority rules.

Aspects of the disclosure are initially described in the context of wireless communications systems. Additional aspects of the disclosure are described in the context of an additional wireless communications system, an uplink channel resource set scheme, and a process flow. Aspects of the disclosure are further illustrated by and described with reference to apparatus diagrams, system diagrams, and flowcharts that relate to handling collisions between a feedback message and uplink control information.

FIG. 1 illustrates an example of a wireless communications system 100 that supports handling collisions between a feedback message and uplink control information in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical)

communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

Wireless communications systems are widely deployed to provide various types of communication content such as voice, video, packet data, messaging, broadcast, and so on. These systems may be multiple-access systems capable of supporting communication with multiple users by sharing the available system resources (e.g., time, frequency, and power). A wireless network, for example a wireless local area network (WLAN), such as a Wi-Fi (i.e., Institute of Electrical and Electronics Engineers (IEEE) 802.11) network may include an access point (AP) that may communicate with one or more wireless or mobile devices. The AP may be coupled to a network, such as the Internet, and may enable a mobile device to communicate via the network (or communicate with other devices coupled to the access point). A wireless device may communicate with a network device bi-directionally. For example, in a WLAN, a device may communicate with an associated AP via downlink (e.g., the communication link from the AP to the device) and uplink (e.g., the communication link from the device to the AP). A wireless personal area network (PAN), which may include a Bluetooth connection, may provide for short range wireless connections between two or more paired wireless devices. For example, wireless devices such as cellular phones may utilize wireless PAN communications to exchange information such as audio signals with wireless headsets.

Generally, the described techniques provide for a UE 115 to resolve overlap between a resource for a sub-slot-based feedback message (e.g., hybrid automatic repeat request (HARQ) acknowledgement (ACK) messages) and a resource for slot-based uplink control information. For instance, a base station 105 may transmit, to a UE 115, scheduling information for transmitting uplink control information in a first resource, where the first resource spans at least portions of a set of transmission time intervals. The base station 105 may transmit, to the UE 115, a downlink data message to be acknowledged via a feedback message in a second resource, where the second resource is within one of the set of transmission time intervals. The UE 115 may identify that the first resource overlaps in time with the second resource. The UE 115 and base station 105 may determine respective resources for transmission of the feedback message based on the first resource overlapping the second resource, the first resource spanning at least portions of the set of transmission time intervals, and the second resource being within one of the set of transmission time intervals. The UE 115 may transmit, to the base station 105, the feedback message via the determined resource.

Figure 2:
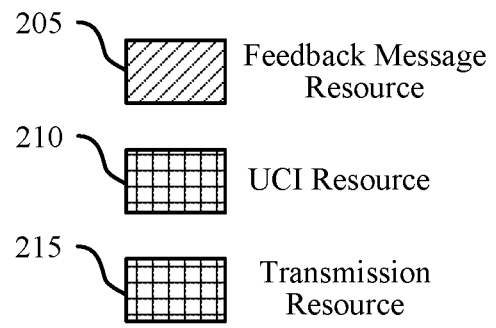
FIG. 2 illustrates an example of a wireless communications system that supports handling collisions between a feedback message and uplink control information in accordance with aspects of the present disclosure.
Figure 2:
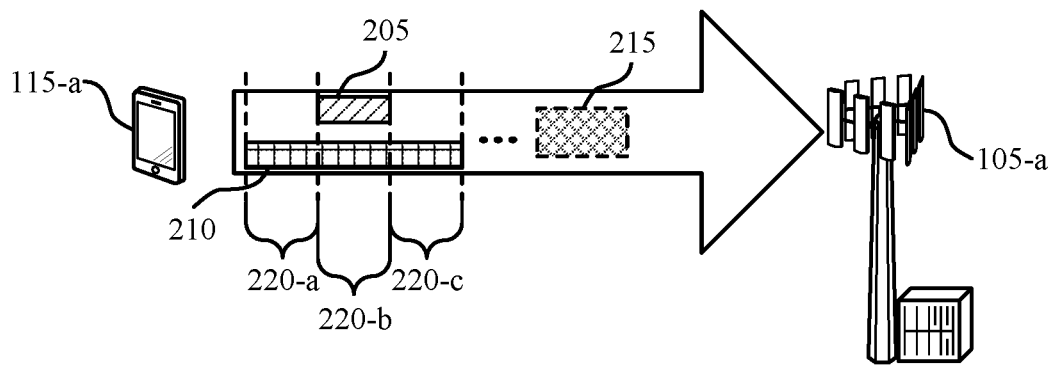

FIG. 2 illustrates an example of a wireless communications system 200 that supports handling collisions between a feedback message and uplink control information in accordance with aspects of the present disclosure. In some examples, wireless communications system 200 may implement aspects of wireless communications system 100. For instance, UE 115-*a* may be an example of aspects of a UE 115 as described with reference to FIG. 1 and base station 105-*a* may be an example of aspects of a base station 105 as described with reference to FIG. 1.

In some examples, UE 115-*a* may be scheduled to transmit a feedback message (e.g., a HARQ-ACK report) over a feedback message resource 205 to base station 105-*a*. UE 115-*a* may receive a downlink data message (e.g., a physical downlink shared channel (PDSCH) transmission) to be acknowledged in the feedback message resource 205. In some examples, the feedback message resource 205 may be within a TTI 220 (e.g., TTI 220-*b*), where each TTI 220 may span a sub-slot (e.g., 7 OFDM symbols). In some examples, the feedback message resource 205 may not cross a boundary of the TTI 220 in which it is scheduled (e.g., the length of the feedback message resource 205 in time may not be larger than a duration of the TTI 220). In some examples, the feedback message resource 205 may be scheduled by downlink control information (DCI) provided by a base station (e.g., base station 105-*a*). The feedback message resource 205 may be scheduled on a sub-slot level and may thus be referred to as a sub-slot-based feedback message resource 205. The feedback message resource 205 being on a sub-slot level may reduce a latency associated with conveying feedback (e.g., HARQ-ACK feedback). Each slot (e.g., 14 OFDM symbols) may be capable of carrying a multiple feedback messages (e.g., multiple HARQ-ACK reports). However, each sub-slot (e.g., each TTI 220) may include a single feedback message (e.g., a single HARQ-ACK report).

Additionally, UE 115-*a* may be scheduled to transmit UCI (e.g., a CSI report or SR) over a UCI resource 210 to base station 105-*a*. UE 115-*a* may receive scheduling information (e.g., via a DCI) that schedules the UCI resource 210 for transmitting UCI. The UCI resource may span at least portions of a set of TTIs 220 (e.g., TTIs 220-*a*, 220-*b*, and 220-*c*). The UCI resource 210 may be scheduled on a slot level and may thus be referred to as a slot-based UCI resource 210. The UCI resource 210 being slot-based may enable a larger payload to be conveyed and may thus have an increased reliability. The UCI resource 210 may not be limited to a single TTI 220 and may thus be configured across multiple TTIs 220 within a slot.

In some examples, the feedback message resource 205 may overlap or collide with the UCI resource 210 in time (e.g., both may overlap with TTI 220-*b*). In such cases, UE 115-*a* may multiplex (or mux) the feedback message and the UCI onto transmission resource 215, where the transmission resource 215 may be indicated by a parameter (e.g., a PUCCH resource indicator (PRI)) included in a last DCI (e.g., a DCI scheduling the UCI, the feedback message, or both). If a payload size of the multiplexed messages is below a threshold, transmission resource 215 may be sub-slot-based. However, there may be cases where the payload size is above the threshold. In such cases, a transmission resource 215 within a single TTI 220 may be incapable of conveying the multiplexed messages (the transmission resource 215 used to convey a payload of the payload size may have a duration larger than a single TTI 220). Additional details about the payload size and this scenario may be described with reference to FIG. 3.

In one example, to select a transmission resource 215, the UE may be configured with a first set of transmission resources (e.g., PUCCH resources) over which the sub-slot-based feedback message may be transmitted when not overlapping with slot-based UCI as well as a second set of transmission resources (e.g., PUCCH resources) over which a multiplexed feedback message and UCI may be transmitted when the sub-slot-based feedback message overlaps the slot-based UCI. The first set of transmission resources (e.g., which may also be referred to as an uplink channel resource set) may include slot-based resources that are not constrained to reside within a single TTI 220 (e.g., a single sub-slot). UE 115-*a* may multiplex the sub-slot-based feedback message with slot-based UCI and may select the slot-based transmission resource 215 from the first set of transmission resources. The determination of the slot-based transmission resource 215 may be based on a PUCCH resource indictor (PRI) included in a DCI scheduling the feedback message.

In another example, the overlapping feedback message and UCI may be multiplexed onto a slot-based UCI resource. For instance, the UCI and feedback message may be multiplexed onto the slot-based UCI resource 210 (e.g., a CSI resource) overlapping the sub-slot-based feedback message resource 205 or onto another slot-based UCI resource (e.g., another slot-based UCI resource scheduled for transmission of a CSI report at a time when the UE determines the overlap). The slot-based transmission resource 215 onto which the feedback message and UCI are multiplexed may be configured for transmitting CSI. In some examples, the transmission resource 215 may be a resource configured to transmit multiplexed CSI reports.

In yet another example, the UE may drop the UCI or may multiplex the UCI with the feedback message based on a type of the UCI. For instance, if the UCI includes an SR, the UE may multiplex the SR with the feedback message on a sub-slot-based transmission resource. However, if the UCI includes CSI, the UE may drop the CSI (e.g., the UE may not multiplex the CSI with the feedback message and may not transmit the CSI over the overlapping slot-based UCI resource). Alternatively, if the UCI includes the CSI, the UE may drop a portion of the CSI and may multiplex the remaining portion with the feedback message on a sub-slot-based transmission resource. The UE may determine which portions to drop and which portions to multiplex according to a set of priority rules.

It should be noted that transmission resource 215 as depicted is exemplary and the transmission resource 215 may have different configurations according to the methods as described herein. For instance, transmission resource 215 may be outside of TTIs 220-*a*, 220-*b*, and 220-*c*, or may overlap with TTIs 220-*a*, 220-*b*, and 220-*c*. In cases where transmission resource 215 is slot-based (e.g., when the feedback message and the UCI are multiplexed on a resource spanning at least portions of multiple TTIs 220), the transmission resource 215 may, in some examples, be UCI resource 210. Additionally or alternatively, when the transmission resource is sub-slot-based (e.g., when the feedback message and the UCI are multiplexed on a resource within a TTI 220), the transmission resource 215 may, in some examples, be feedback message resource 205.

Additionally, in some examples, base station 105-*a* may determine a communication resource for receiving the feedback message based on the examples as described herein. For instance, base station 105-*a* may determine the communication resource based on determining that UE 115-*a* is to transmit over the first set of transmission resources. Additionally or alternatively, base station 105-*a* may determine the communication resource based on determining that UE 115-*a* is to multiplex the feedback message with the UCI message on a slot-based resource (e.g., a CSI resource or a resource for multiplexed CSIs). Additionally or alternatively, base station 105-*a* may determine the communication resource based on determining that UE 115-*a* is to at least partially drop the UCI.

The methods described herein may have one or more advantages. For instance, by multiplexing the feedback message and the UCI on a slot-based transmission resource 215, the UE 115 may be capable of transmitting multiplexed messages with payload sizes larger than that a sub-slot based transmission resource may carry (e.g., UE 115-*a* may not be limited to selecting between the UCI and the feedback message). Additionally, in cases where the UE 115 drops the UCI or at least portions, the methods as described herein may enable the UE to still transmit the feedback message within a sub-slot based resource.

Figure 3:
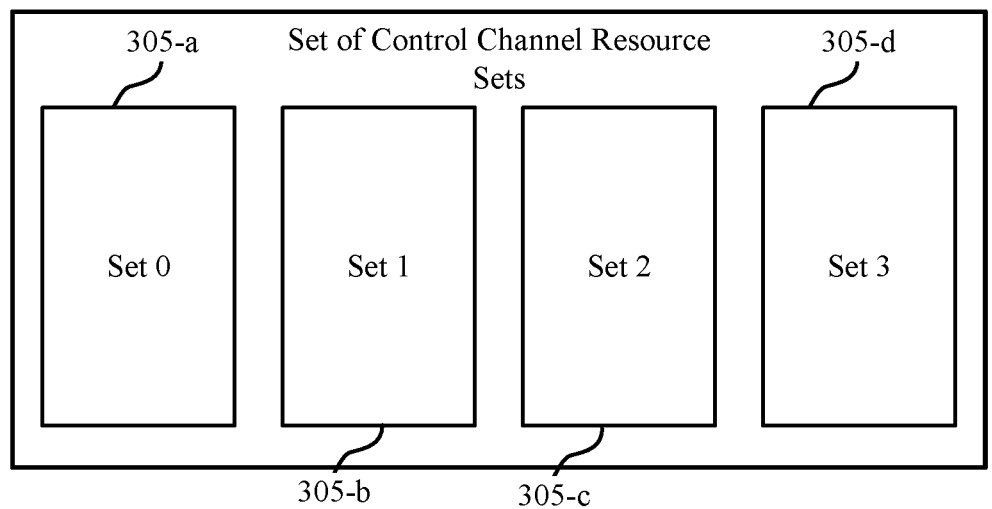
FIG. 3 illustrates an example of an uplink channel resource set scheme that supports handling collisions between a feedback message and uplink control information in accordance with aspects of the present disclosure.

FIG. 3 illustrates an example of an uplink channel resource set scheme 300 that supports handling collisions between a feedback message and uplink control information in accordance with aspects of the present disclosure. In some examples, uplink channel resource set scheme 300 may be implemented by aspects of wireless communications systems 100 and/or 200. For instance, uplink channel resource set scheme 300 may represent a set of uplink channel resource sets used by a UE 115 to determine a transmission resource (e.g., a transmission resource 215 as described with reference to FIG. 2).

In some examples, a UE 115 may be configured with a set of uplink channel resource sets 310 (e.g., PUCCH resource sets) that include N uplink channel resource sets. For instance, the UE 115 may include uplink channel resource sets 305-*a*, 305-*b*, 305-*c*, and 305-*d* (e.g., where N=4). Each uplink channel resource set may include one or more uplink channel resources (e.g., one or more PUCCH resources) and may each be configured for a payload of size k in a respective range. For instance, uplink channel resource set 305-*a* may be associated with payload size 0<k<2; uplink channel resource set 305-*b* may be associated with 2<k≤MaxPayload1; uplink channel resource set 305-*c* may be associated with MaxPayload1<k≤MaxPayload2; and uplink channel resource set 305-*d* may be associated with MaxPayload2<k<MaxPayload3. It should be noted that other range values may be used without deviating from the scope of the present disclosure.

When determining a transmission resource, the UE 115 may identify a payload size k and may determine the corresponding uplink channel resource set 305. The UE 115 may then select a transmission resource from the determined resource set based on a parameter included in a DCI message (e.g., a PUCCH resource indicator (PRI). The DCI message may be a DCI message scheduling UCI (e.g., a CSI report, an SR), a feedback message (e.g., a HARQ-ACK), or both. For instance, a UE 115 may select the transmission resource from uplink channel resource set 305-*a* for payload size 0<k<2; may select the transmission resource from uplink channel resource set 305-*b* for payload size 2<k≤MaxPayload1; may select the transmission resource from uplink channel resource set 305-*c* for payload size MaxPayload1<k≤MaxPayload2; and may select the transmission resource from uplink channel resource set for payload size MaxPayload2<k<MaxPayload3. It should be noted that other range values may be used without deviating from the scope of the present disclosure.

When performing multiplexing (e.g., multiplexing UCI with a feedback message), the UE 115 may reselect a resource based on ranges disclosed herein. For instance, in cases where the uplink channel resource sets 305 are for the feedback message, before multiplexing the payload size of a feedback message may be $k_1$, where 2<$k_1$≤MaxPayload. Accordingly, the transmission resource for transmitting the feedback message alone may be selected from uplink channel resource set 305-*b*. However, after multiplexing the feedback message with UCI, the payload size of the feedback message may be $k_2$, where $k_1$<$k_2$. If $k_2$<MaxPayload3, the UE 115 may transmit the UCI and the feedback message on a same transmission resource selected from uplink channel resource sets 305-*b*, 305-*c*, or 305-*d*.

However, if $k_2$>MaxPayload3, the UE 115 be incapable of using the set of uplink channel resource sets 305 to transmit the multiplexed messages. Accordingly, the techniques as described herein may be used. For instance, the UE 115 may use a slot-based uplink channel resource set 305 to select a transmission resource for transmitting the multiplexed messages. Alternatively, the UE 115 may transmit the multiplexed messages over a slot-based UCI resource or a resource configured for transmitting multiplexed CSIs. Alternatively, the UE 115 may drop the UCI transmission (e.g., the UE 115 may not multiplex the UCI with the feedback message). In such cases, the UE 115 may select the transmission resource according to $k_1$. Additionally or alternatively, in cases where the UCI transmission includes a CSI report, the UE 115 may multiplex a first portion of the CSI report with the feedback message and may drop a remaining portion of the CSI report. In such cases, the corresponding payload size may be $k_3$ where $k_1$<$k_3$<MaxPayload3<$k_2$.

Figure 4:
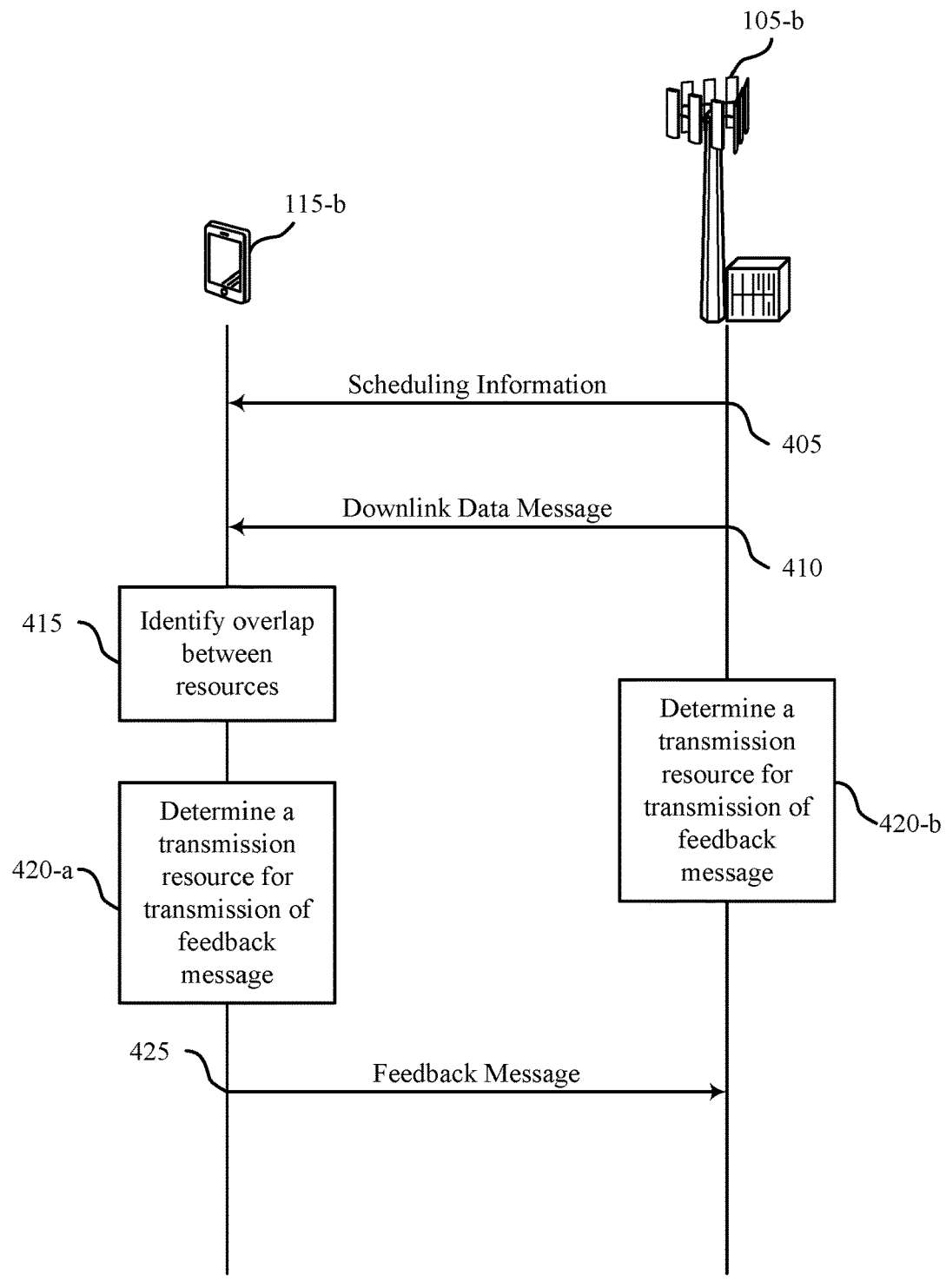
FIG. 4 illustrates an example of a process flow that supports handling collisions between a feedback message and uplink control information in accordance with aspects of the present disclosure.

FIG. 4 illustrates an example of a process flow 400 that supports handling collisions between a feedback message and uplink control information in accordance with aspects of the present disclosure. In some examples, process flow 400 may implement aspects of wireless communications system 100. For instance, UE 115-*b* may be an example of aspects of a UE 115 as described with reference to FIG. 1 and base station 105-*b* may be an example of aspects of a base station 105 as described with reference to FIG. 1.

At 405, base station 105-*b* may transmit scheduling information for transmitting UCI in a first resource. The resource may span at least portions of a set of TTIs (e.g., the UCI may be slot-based). UE 115-*b* may receive the scheduling information. In some cases, base station 105-*b* transmitting the scheduling information may involve base station 105-*b* transmitting a DCI including the scheduling information.

At 410, base station 105-*b* may transmit a downlink data message (e.g., a PDSCH transmission) to be acknowledged via a feedback message (e.g., a HARQ-ACK) in a second resource. The second resource may be within one of the set of TTIs (e.g., the feedback message may be sub-slot-based). UE 115-*b* may receive the downlink data message. In some examples where the scheduling information at 405 is provided via a DCI, the DCI may include an indication of the second resource.

At 415, UE 115-*b* may identify that the first resource overlaps in time with the second resource.

At 420-*a*, UE 115-*b* may determine a transmission resource for transmission of the feedback message. UE 115-*b* may determine the transmission resource based on the first resource overlapping the second resource, the first resource spanning at least portions of the set of TTIs, and the second resource being within one of the set of TTIs.

In some examples, determining the transmission resource may involve UE 115-*b* identifying the transmission resource from a first uplink channel resource set (e.g., a first PUCCH resource set). In such cases, the first uplink channel resource set may be for transmitting the feedback message when the feedback message is multiplexed with UCI and may be different from a second uplink channel resource set (e.g., a second PUCCH resource set) for transmitting the feedback message without the feedback message being multiplexed with the UCI. In some examples, the first uplink channel resource set may include a set of uplink channel resources. In such cases, determining the transmission resource may involve UE 115-*b* selecting the transmission resource from among the set of uplink channel resources based on a size of the feedback message and a size of the UCI. Additionally or alternatively, in cases where the scheduling information is provided via DCI, determining the transmission resource may involve UE 115-*b* selecting the transmission resource from among the set of uplink channel resource based on a parameter included in the DCI (e.g., PRI). The parameter may indicate that the transmission resource is to be selected from among a set of uplink channel resources. In some examples, the one or more uplink channel resources of the first uplink channel resource set may span at least portions of a respective set of TTIs. Additionally, each uplink channel resource of the second uplink channel resource set may be within a single TTI.

In some examples, UE 115-*b* determining the transmission resource may involve UE 115-*b* selecting the first resource (e.g., the resource overlapping the first resource for the feedback message) as the transmission resource. In some examples, UE 115-*b* determining the transmission resource may involve identifying that the transmission resource is an uplink control channel resource (e.g., a PUCCH resource) configured for transmitting a first CSI report multiplexed with a second CSI report. In some examples, the transmission resource may span at least portions of a second set of TTIs. In some examples, determining the transmission resource may involve UE 115-*b* selecting the transmission resource from an uplink channel resource set (e.g., a PUCCH resource set), where each uplink channel resource of the uplink channel resource set may have a duration equal to or less than the TTI (e.g., each uplink channel resource may be within a sub-slot).

At 420-*b*, base station 105-*b* may determine a communication resource for reception of the feedback message (e.g., the transmission resource as that determined by UE 115-*b*). Base station 105-*b* may determine the communication resource based on the first resource overlapping the second resource, the first resource spanning at least portions of the set of TTIs, and the second resource being within one of the set of TTIs.

In some examples, determining the communication resource may involve base station 105-*b* identifying the communication resource from a first uplink channel resource set (e.g., the same first uplink channel resource set identified by UE 115-*b*). In such cases, the first uplink channel resource set may be for receiving the feedback message when the feedback message is multiplexed with UCI and may be different from a second uplink channel resource set (e.g., the same second uplink channel resource set identified by UE 115-*b*) for receiving the feedback message without the feedback message being multiplexed with the UCI. In some examples, the first uplink channel resource set may include a set of uplink channel resources. In such cases, determining the communication resource may involve base station 105-*b* identifying the communication resource based on a size of the feedback message and a size of the UCI.

In some examples, the first resource (e.g., the resource overlapping the first resource for the feedback message) may be the communication resource. In some examples, base station 105-*b* determining the communication resource may involve identifying that the communication resource is an uplink control channel resource (e.g., a PUCCH resource) configured for receiving a first CSI report multiplexed with a second CSI report. In some examples, the communication resource may span at least portions of a second set of TTIs. In some examples, determining the communication resource may involve base station 105-*b* identifying the communication resource from an uplink channel resource set (e.g., a PUCCH resource set), where each uplink channel resource of the uplink channel resource set may have a duration equal to or less than the TTI (e.g., each uplink channel resource may be within a sub-slot).

Additionally or alternatively, in cases where the scheduling information is provided via DCI, determining the communication resource may involve UE 115-*b* selecting the communication resource from among the set of uplink channel resource based on a parameter included in the DCI (e.g., PRI). The parameter may indicate that the communication resource is to be selected from among a set of uplink channel resources. In some examples, the one or more uplink channel resources of the first uplink channel resource set may span at least portions of a respective set of TTIs. Additionally, each uplink channel resource of the second uplink channel resource set may be within a single TTI.

At 425, UE 115-*b* may transmit the feedback message via the transmission resource. Base station 105-*b* may receive the feedback message. In some examples, UE 115-*b* may multiplex the feedback message with the UCI. For instance, if the UCI includes an SR, UE 115-*b* may multiplex the SR with the feedback message. In such examples, transmitting the feedback message may involve transmitting the multiplexed feedback message and UCI via the transmission resource. In such cases, base station 105-*b* may receive the multiplexed feedback message and UCI via the communication resource.

In some examples UE 115-*b* may refrain from multiplexing the UCI or aspects of the UCI with the feedback message. For instance, if the UCI includes a CSI report, UE 115-*b* may refrain from including the CSI report with the feedback message on the transmission resource. In such cases, base station 105-*b* may receive the feedback message without a CSI report of the UCI. Alternatively, UE 115-*b* may identify a first subset and a second subset of the CSI report and may multiplex the first subset with the feedback message. In such cases, UE 115-*b* transmitting the feedback message may involve transmitting the multiplexed first subset and feedback message via the transmission resource. Additionally, UE 115-*b* may refrain from transmitting the second subset based on each uplink channel resource of the uplink channel resource set being within a respective TTI. The first subset of the CSI report may include a first set of CSI messages associated with a first set of CSI processes and the second subset of the CSI report may include a second set of CSI messages associated with a second set of CSI processes. Base station 105-*b* may receive the first set of CSI messages multiplexed with the feedback message, where the feedback message may not be multiplexed with the second set of CSI messages. Base station 105-b may identify the first set of CSI processes and the second set of CSI processes prior to receiving the feedback messages.

Figure 5:
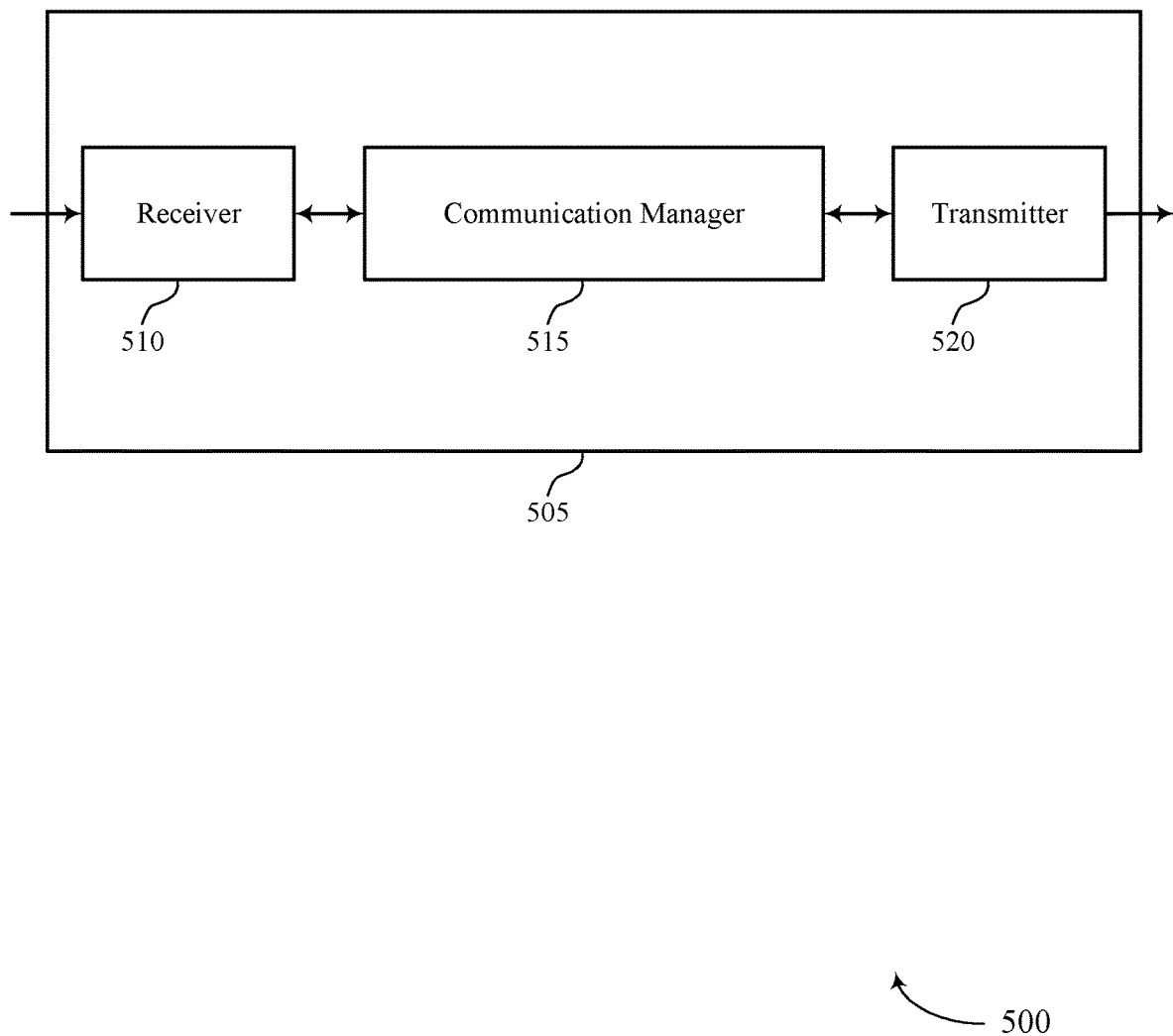
FIGS. 5 and 6 show block diagrams of devices that support handling collisions between a feedback message and uplink control information in accordance with aspects of the present disclosure.

FIG. 5 shows a block diagram 500 of a device 505 that supports handling collisions between a feedback message and uplink control information in accordance with aspects of the present disclosure. The device 505 may be an example of aspects of a UE 115 as described herein. The device 505 may include a receiver 510, a communication manager 515, and a transmitter 520. The device 505 may also include a processor. Each of these components may be in communication with one another (e.g., via one or more buses).

The receiver 510 may receive information such as packets, user data, or control information associated with various information channels (e.g., control channels, data channels, and information related to handling collisions between a feedback message and uplink control information, etc.). Information may be passed on to other components of the device 505. The receiver 510 may be an example of aspects of the transceiver 815 described with reference to FIG. 8. The receiver 510 may utilize a single antenna or a set of antennas.

The communication manager 515 may receive scheduling information for transmitting uplink control information in a first resource, where the first resource spans at least portions of a set of transmission time intervals; receive a downlink data message to be acknowledged via a feedback message in a second resource, where the second resource is within one of the set of transmission time intervals; identify that the first resource overlaps in time with the second resource; determine a transmission resource for transmission of the feedback message based on the first resource overlapping the second resource, the first resource spanning at least portions of the set of transmission time intervals, and the second resource being within one of the set of transmission time intervals; and transmit the feedback message via the transmission resource. The communication manager 515 may be an example of aspects of the communication manager 810 described herein.

By including or configuring the communication manager 515 in accordance with examples as described herein, the device 505 (e.g., a processor controlling or otherwise coupled to the receiver 510, the transmitter 520, the communication manager 515, or a combination thereof may support techniques for the device 505 to transmit feedback messages with payload sizes larger than that which resources of a single transmission time interval may carry. Accordingly, the feedback message may convey both the uplink control information and the feedback of the feedback message. Being able to convey both the uplink control information and the feedback may increase the efficiency of communication between the device 505 and another device with which the device 505 communicates.

The communication manager 515, or its sub-components, may be implemented in hardware, code (e.g., software or firmware) executed by a processor, or any combination thereof. If implemented in code executed by a processor, the functions of the communication manager 515, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communication manager 515, or its sub-components, may be physically located at various positions, including being distributed such that portions of functions are implemented at different physical locations by one or more physical components. In some examples, the communication manager 515, or its sub-components, may be a separate and distinct component in accordance with various aspects of the present disclosure. In some examples, the communication manager 515, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 520 may transmit signals generated by other components of the device 505. In some examples, the transmitter 520 may be collocated with a receiver 510 in a transceiver module. For example, the transmitter 520 may be an example of aspects of the transceiver 815 described with reference to FIG. 8. The transmitter 520 may utilize a single antenna or a set of antennas.

Figure 6:
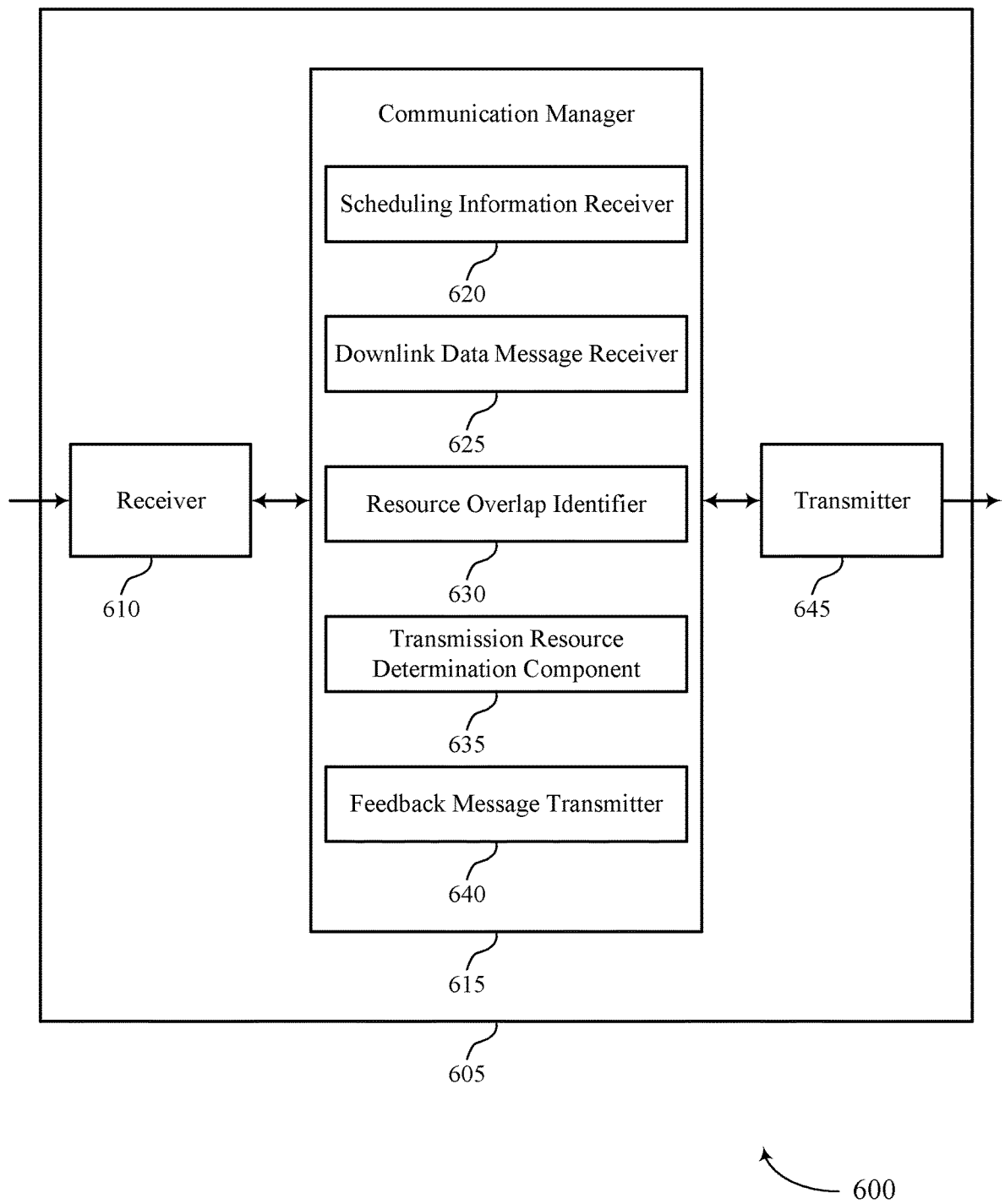

FIG. 6 shows a block diagram 600 of a device 605 that supports handling collisions between a feedback message and uplink control information in accordance with aspects of the present disclosure. The device 605 may be an example of aspects of a device 505, or a UE 115 as described herein. The device 605 may include a receiver 610, a communication manager 615, and a transmitter 645. The device 605 may also include a processor. Each of these components may be in communication with one another (e.g., via one or more buses).

The receiver 610 may receive information such as packets, user data, or control information associated with various information channels (e.g., control channels, data channels, and information related to handling collisions between a feedback message and uplink control information, etc.). Information may be passed on to other components of the device 605. The receiver 610 may be an example of aspects of the transceiver 815 described with reference to FIG. 8. The receiver 610 may utilize a single antenna or a set of antennas.

The communication manager 615 may be an example of aspects of the communication manager 515 as described herein. The communication manager 615 may include a scheduling information receiver 620, a downlink data message receiver 625, a resource overlap identifier 630, a transmission resource determination component 635, and a feedback message transmitter 640. The communication manager 615 may be an example of aspects of the communication manager 810 described herein.

The scheduling information receiver 620 may receive scheduling information for transmitting uplink control information in a first resource, where the first resource spans at least portions of a set of transmission time intervals.

The downlink data message receiver 625 may receive a downlink data message to be acknowledged via a feedback message in a second resource, where the second resource is within one of the set of transmission time intervals.

The resource overlap identifier 630 may identify that the first resource overlaps in time with the second resource.

The transmission resource determination component 635 may determine a transmission resource for transmission of the feedback message based on the first resource overlapping the second resource, the first resource spanning at least portions of the set of transmission time intervals, and the second resource being within one of the set of transmission time intervals.

The feedback message transmitter 640 may transmit the feedback message via the transmission resource.

The transmitter 645 may transmit signals generated by other components of the device 605. In some examples, the transmitter 645 may be collocated with a receiver 610 in a transceiver module. For example, the transmitter 645 may be an example of aspects of the transceiver 815 described with reference to FIG. 8. The transmitter 645 may utilize a single antenna or a set of antennas.

Figure 7:
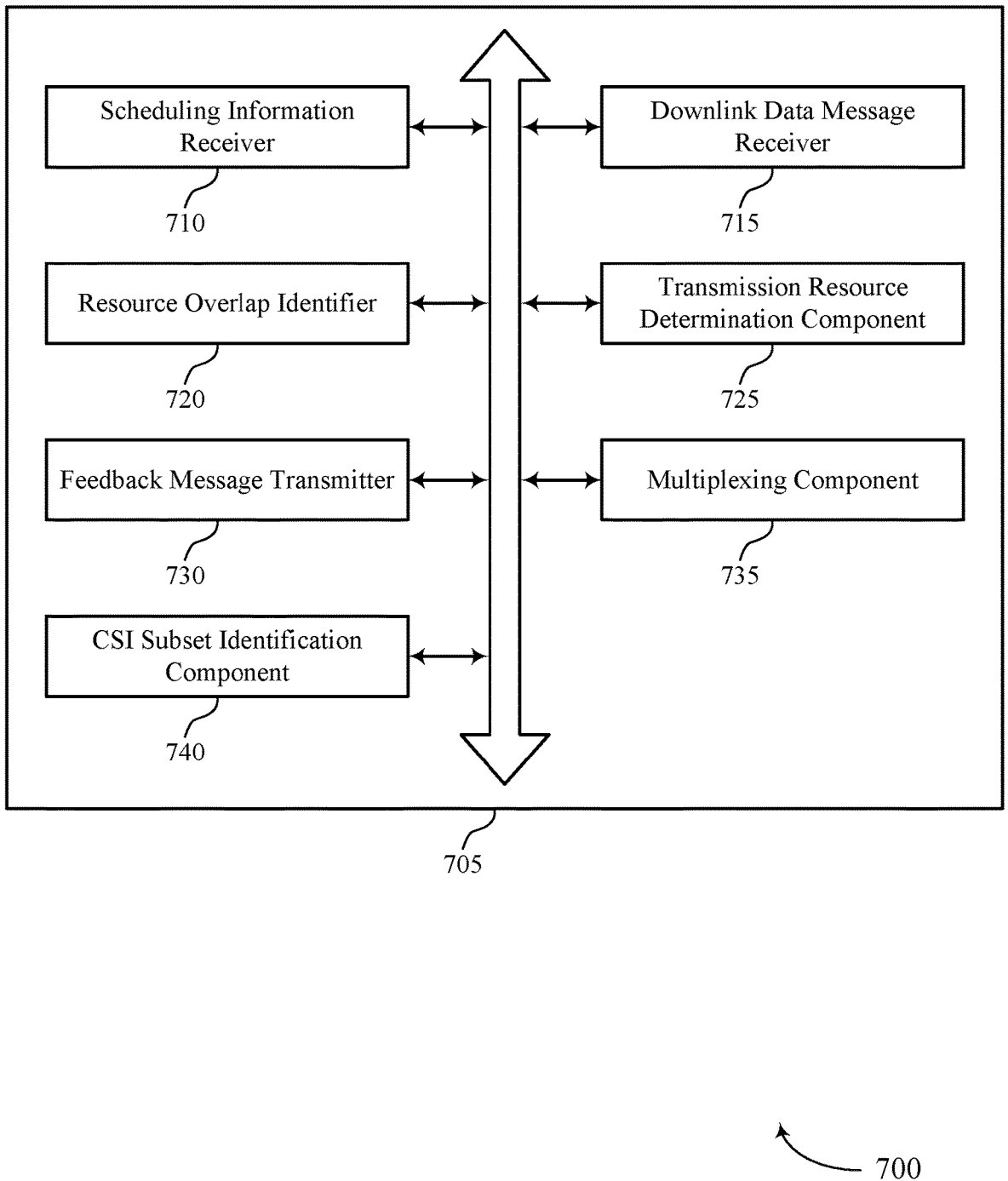
FIG. 7 shows a block diagram of a communication manager that supports handling collisions between a feedback message and uplink control information in accordance with aspects of the present disclosure.

FIG. 7 shows a block diagram 700 of a communication manager 705 that supports handling collisions between a feedback message and uplink control information in accordance with aspects of the present disclosure. The communication manager 705 may be an example of aspects of a communication manager 515, a communication manager 615, or a communication manager 810 described herein. The communication manager 705 may include a scheduling information receiver 710, a downlink data message receiver 715, a resource overlap identifier 720, a transmission resource determination component 725, a feedback message transmitter 730, a multiplexing component 735, and a CSI subset identification component 740. Each of these modules may communicate, directly or indirectly, with one another (e.g., via one or more buses).

The scheduling information receiver 710 may receive scheduling information for transmitting uplink control information in a first resource, where the first resource spans at least portions of a set of transmission time intervals.

The downlink data message receiver 715 may receive a downlink data message to be acknowledged via a feedback message in a second resource, where the second resource is within one of the set of transmission time intervals. In some examples, the uplink control information includes a channel state information report available for transmission. In some cases, the uplink control information includes a channel state information report, a scheduling request, or both.

The resource overlap identifier 720 may identify that the first resource overlaps in time with the second resource.

The transmission resource determination component 725 may determine a transmission resource for transmission of the feedback message based on the first resource overlapping the second resource, the first resource spanning at least portions of the set of transmission time intervals, and the second resource being within one of the set of transmission time intervals.

In some examples, the transmission resource determination component 725 determining the transmission resource may involve identifying the transmission resource from a first uplink channel resource set, where the first uplink channel resource set is for transmitting the feedback message when the feedback message is multiplexed with the uplink control information and is different from a second uplink channel resource set which is for transmitting the feedback message without the feedback message being multiplexed with the uplink control information. In some examples, the first uplink channel resource set may include a set of uplink channel resources, where the transmission resource determination component 725 determining the transmission resource may involve selecting the transmission resource from among the set of uplink channel resources based on a size of the feedback message and a size of the uplink control information. In some examples, the first uplink channel resource set may include a set of uplink channel resources, where the scheduling information receiver 710 receiving the scheduling information involves receiving downlink control information that includes the scheduling information and an indication of the second resource, and where the downlink control information includes a parameter indicating that the transmission resource is to be selected from among the set of uplink channel resources. In such cases, the transmission resource determination component 725 may select the transmission resource from among the set of uplink channel resources based on the parameter. In some examples, the one or more uplink channel resources of the first uplink channel resource set may span at least portions of a respective set of transmission time intervals, and each uplink channel resource of the second uplink channel resource set may be within a single transmission time interval.

In some examples, the transmission resource determination component 725 determining the transmission resource may involve selecting the first resource as the transmission resource. In some examples, the transmission resource determination component 725 determining the transmission resource may involve identifying that the transmission resource is an uplink control channel resource configured for transmitting a first channel state information report multiplexed with a second channel state information report. In some examples, the transmission resource determination component 725 determining the transmission resource may involve selecting the transmission resource from an uplink channel resource set, where each uplink channel resource of the uplink channel resource set has a duration equal to or less than the transmission time interval. In some examples, the transmission resource may span at least portions of a second set of transmission time intervals.

The feedback message transmitter 730 may transmit the feedback message via the transmission resource. In some examples, the feedback message transmitter 730 may refrain from including a channel state information report of the uplink control information with the feedback message on the transmission resource. In some examples, the feedback message transmitter 730 may refrain from transmitting a second subset of a channel state information report based on each uplink channel resource of the uplink channel resource set being within a respective transmission time interval.

The multiplexing component 735 may multiplex the feedback message with the uplink control information, where transmitting the feedback message includes transmitting the multiplexed feedback message and uplink control information via the transmission resource. In some examples, the multiplexing component 735 may multiplex, on the transmission resource, the feedback message with a scheduling request of the uplink control information. In some examples, the multiplexing component 735 may multiplex a first subset of a channel state information report with the feedback message, where transmitting the feedback message includes transmitting the multiplexed first subset and feedback message via the transmission resource.

The CSI subset identification component 740 may identify a first subset and a second subset of the channel state information report.

Figure 8:
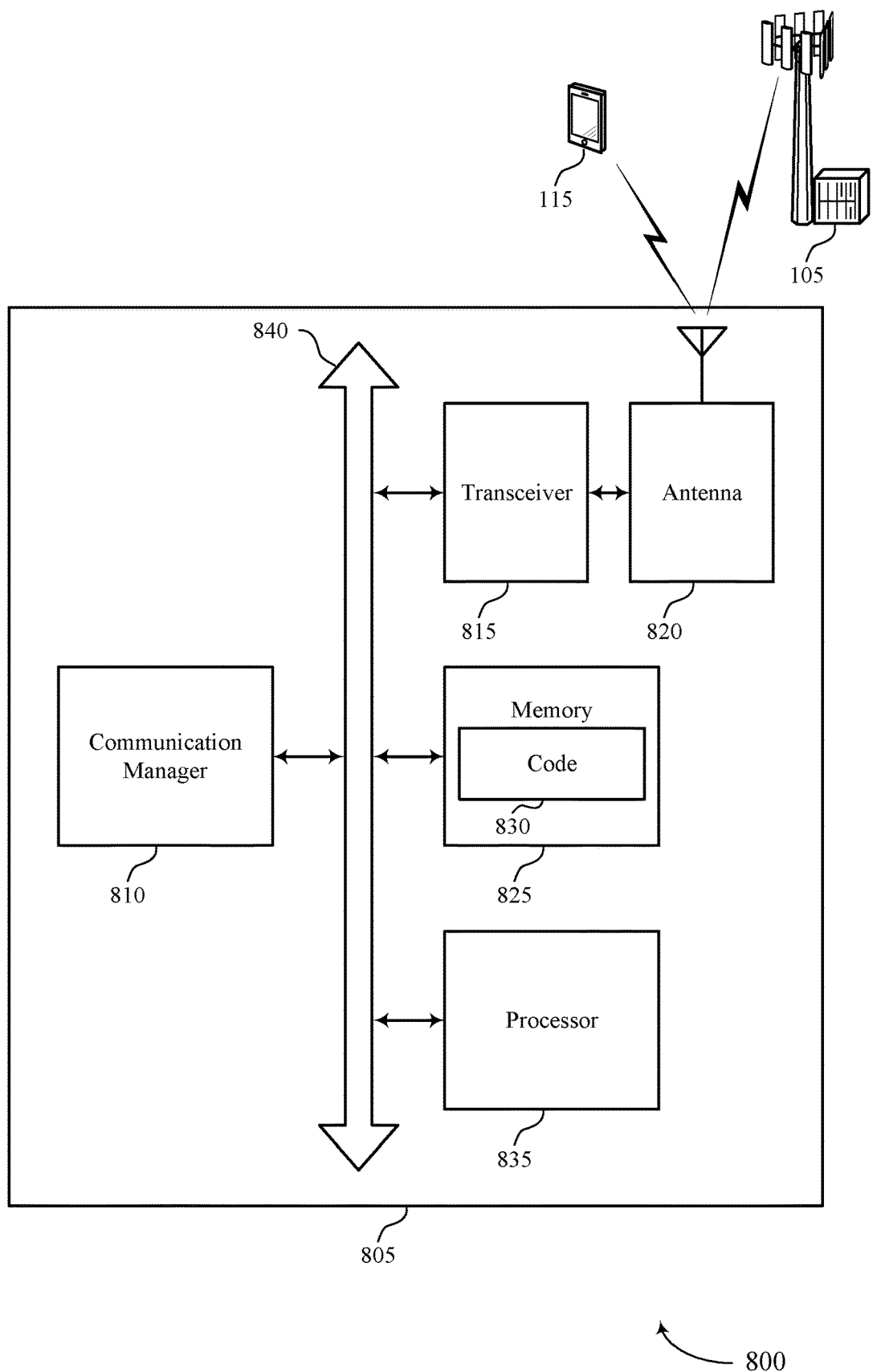
FIG. 8 shows a diagram of a system including a device that supports handling collisions between a feedback message and uplink control information in accordance with aspects of the present disclosure.

FIG. 8 shows a diagram of a system 800 including a device 805 that supports handling collisions between a feedback message and uplink control information in accordance with aspects of the present disclosure. The device 805 may be an example of or include the components of device 505, device 605, or a UE 115 as described herein. The device 805 may include components for bi-directional voice and data communications including components for transmitting and receiving communications, including a communication manager 810, a transceiver 815, an antenna 820, memory 825, and a processor 835. These components may be in electronic communication via one or more buses (e.g., bus 840).

The communication manager 810 may receive scheduling information for transmitting uplink control information in a first resource, where the first resource spans at least portions of a set of transmission time intervals; receive a downlink data message to be acknowledged via a feedback message in a second resource, where the second resource is within one of the set of transmission time intervals; identify that the first resource overlaps in time with the second resource; determine a transmission resource for transmission of the feedback message based on the first resource overlapping the second resource, the first resource spanning at least portions of the set of transmission time intervals, and the second resource being within one of the set of transmission time intervals; and transmit the feedback message via the transmission resource.

The transceiver 815 may communicate bi-directionally, via one or more antennas, wired, or wireless links as described above. For example, the transceiver 815 may represent a wireless transceiver and may communicate bi-directionally with another wireless transceiver. The transceiver 815 may also include a modem to modulate the packets and provide the modulated packets to the antennas for transmission, and to demodulate packets received from the antennas.

In some cases, the wireless device may include a single antenna 820. However, in some cases the device may have more than one antenna 820, which may be capable of concurrently transmitting or receiving multiple wireless transmissions.

The memory 825 may include random-access memory (RAM) and read-only memory (ROM). The memory 825 may store computer-readable, computer-executable code 830 including instructions that, when executed, cause the processor to perform various functions described herein. In some cases, the memory 825 may contain, among other things, a basic input/output system (BIOS) which may control basic hardware or software operation such as the interaction with peripheral components or devices.

The code 830 may include instructions to implement aspects of the present disclosure, including instructions to support wireless communications. The code 830 may be stored in a non-transitory computer-readable medium such as system memory or other type of memory. In some cases, the code 830 may not be directly executable by the processor 835 but may cause a computer (e.g., when compiled and executed) to perform functions described herein.

The processor 835 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 835 may be configured to operate a memory array using a memory controller. In other cases, a memory controller may be integrated into the processor 835. The processor 835 may be configured to execute computer-readable instructions stored in a memory (e.g., the memory 825) to cause the device 805 to perform various functions (e.g., functions or tasks supporting handling collisions between a feedback message and uplink control information).

By including or configuring the communication manager 810 in accordance with examples as described herein, the device 805 may support techniques for the device 805 to transmit feedback messages with payload sizes larger than that which resources of a single transmission time interval may carry. Accordingly, the feedback message may convey both the uplink control information and the feedback of the feedback message. Being able to convey both the uplink control information and the feedback may increase the efficiency of communication between the device 805 and another device with which the device 805 communicates.

Figure 9:
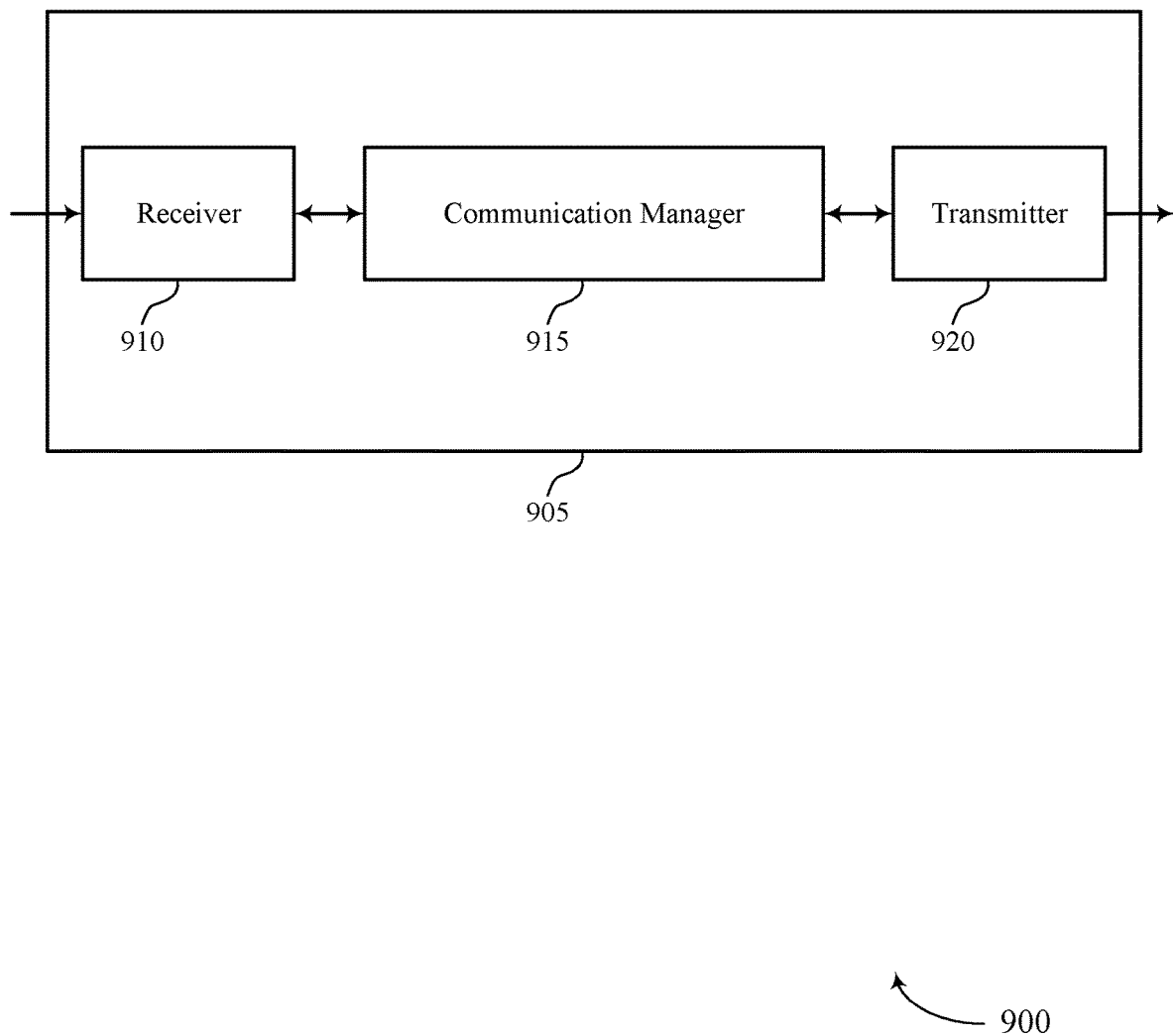
FIGS. 9 and 10 show block diagrams of devices that support handling collisions between a feedback message and uplink control information in accordance with aspects of the present disclosure.

FIG. 9 shows a block diagram 900 of a device 905 that supports handling collisions between a feedback message and uplink control information in accordance with aspects of the present disclosure. The device 905 may be an example of aspects of a base station 105 as described herein. The device 905 may include a receiver 910, a communication manager 915, and a transmitter 920. The device 905 may also include a processor. Each of these components may be in communication with one another (e.g., via one or more buses).

The receiver 910 may receive information such as packets, user data, or control information associated with various information channels (e.g., control channels, data channels, and information related to handling collisions between a feedback message and uplink control information, etc.). Information may be passed on to other components of the device 905. The receiver 910 may be an example of aspects of the transceiver 1220 described with reference to FIG. 12. The receiver 910 may utilize a single antenna or a set of antennas.

The communication manager 915 may transmit scheduling information for transmitting uplink control information in a first resource, where the first resource spans at least portions of a set of transmission time intervals; transmit a downlink data message to be acknowledged via a feedback message in a second resource, where the second resource is within one of the set of transmission time intervals; determine a communication resource for reception of the feedback message based on the first resource overlapping the second resource, the first resource spanning at least portions of the set of transmission time intervals, and the second resource being within one of the set of transmission time intervals; and receive the feedback message via the communication resource. The communication manager 915 may be an example of aspects of the communication manager 1210 described herein.

The communication manager 915, or its sub-components, may be implemented in hardware, code (e.g., software or firmware) executed by a processor, or any combination thereof. If implemented in code executed by a processor, the functions of the communication manager 915, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communication manager 915, or its sub-components, may be physically located at various positions, including being distributed such that portions of functions are implemented at different physical locations by one or more physical components. In some examples, the communication manager 915, or its sub-components, may be a separate and distinct component in accordance with various aspects of the present disclosure. In some examples, the communication manager 915, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 920 may transmit signals generated by other components of the device 905. In some examples, the transmitter 920 may be collocated with a receiver 910 in a transceiver module. For example, the transmitter 920 may be an example of aspects of the transceiver 1220 described with reference to FIG. 12. The transmitter 920 may utilize a single antenna or a set of antennas.

By including or configuring the communication manager 915 in accordance with examples as described herein, the device 905 (e.g., a processor controlling or otherwise coupled to the receiver 910, the communication manager 915, the transmitter 920, or a combination thereof) may support techniques for the device 905 to receive feedback messages with payload sizes larger than that which resources of a single transmission time interval may carry. Accordingly, the feedback message may convey both the uplink control information and the feedback of the feedback message. Being able to receive both the uplink control information and the feedback may increase the efficiency of communication between the device 905 and another device with which the device 905 communicates.

Figure 10:
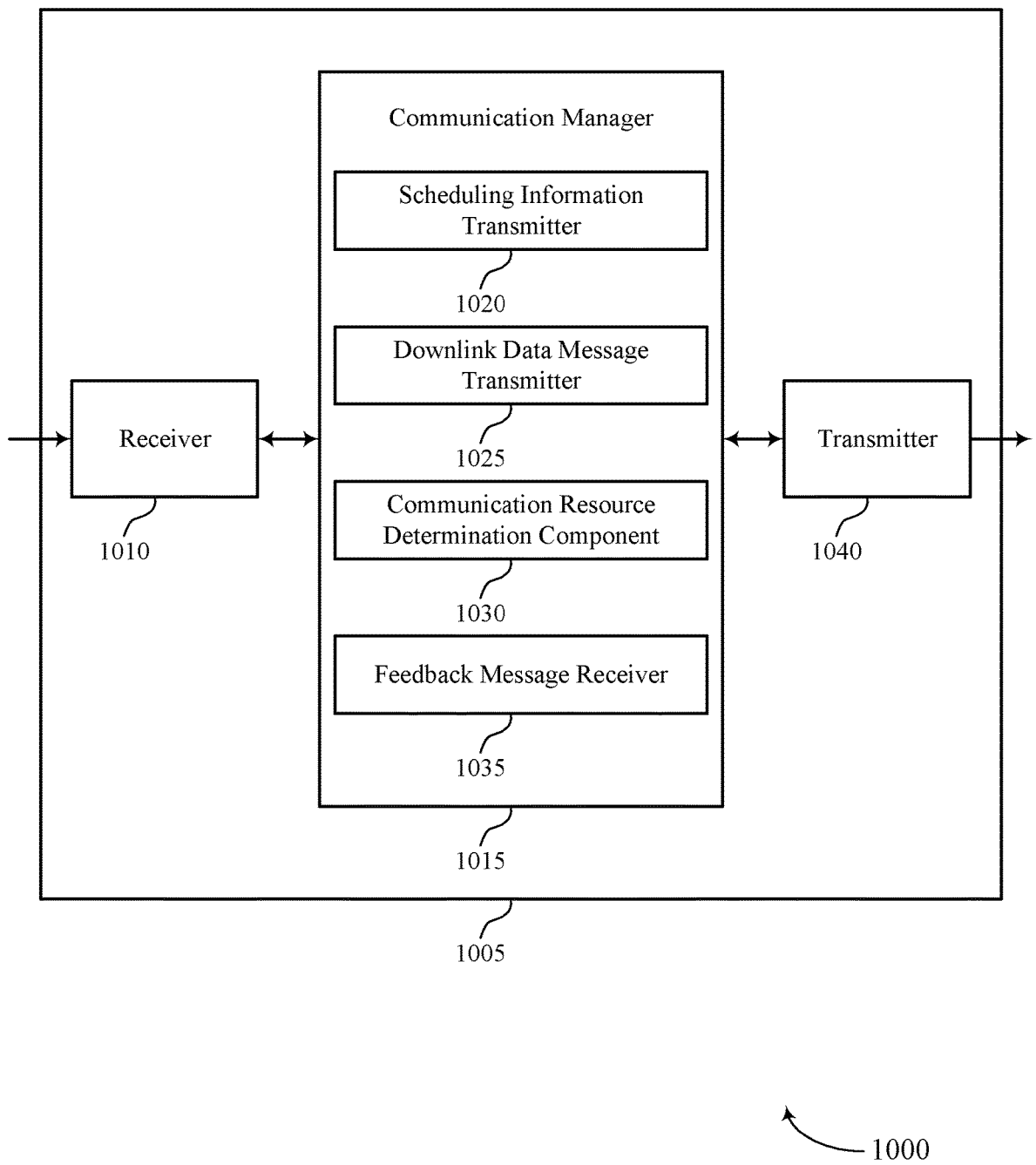

FIG. 10 shows a block diagram 1000 of a device 1005 that supports handling collisions between a feedback message and uplink control information in accordance with aspects of the present disclosure. The device 1005 may be an example of aspects of a device 905, or a base station 105 as described herein. The device 1005 may include a receiver 1010, a communication manager 1015, and a transmitter 1040. The device 1005 may also include a processor. Each of these components may be in communication with one another (e.g., via one or more buses).

The receiver 1010 may receive information such as packets, user data, or control information associated with various information channels (e.g., control channels, data channels, and information related to handling collisions between a feedback message and uplink control information, etc.). Information may be passed on to other components of the device 1005. The receiver 1010 may be an example of aspects of the transceiver 1220 described with reference to FIG. 12. The receiver 1010 may utilize a single antenna or a set of antennas.

The communication manager 1015 may be an example of aspects of the communication manager 915 as described herein. The communication manager 1015 may include a scheduling information transmitter 1020, a downlink data message transmitter 1025, a communication resource determination component 1030, and a feedback message receiver 1035. The communication manager 1015 may be an example of aspects of the communication manager 1210 described herein.

The scheduling information transmitter 1020 may transmit scheduling information for transmitting uplink control information in a first resource, where the first resource spans at least portions of a set of transmission time intervals.

The downlink data message transmitter 1025 may transmit a downlink data message to be acknowledged via a feedback message in a second resource, where the second resource is within one of the set of transmission time intervals.

The communication resource determination component 1030 may determine a communication resource for reception of the feedback message based on the first resource overlapping the second resource, the first resource spanning at least portions of the set of transmission time intervals, and the second resource being within one of the set of transmission time intervals.

The feedback message receiver 1035 may receive the feedback message via the communication resource.

The transmitter 1040 may transmit signals generated by other components of the device 1005. In some examples, the transmitter 1040 may be collocated with a receiver 1010 in a transceiver module. For example, the transmitter 1040 may be an example of aspects of the transceiver 1220 described with reference to FIG. 12. The transmitter 1040 may utilize a single antenna or a set of antennas.

Figure 11:
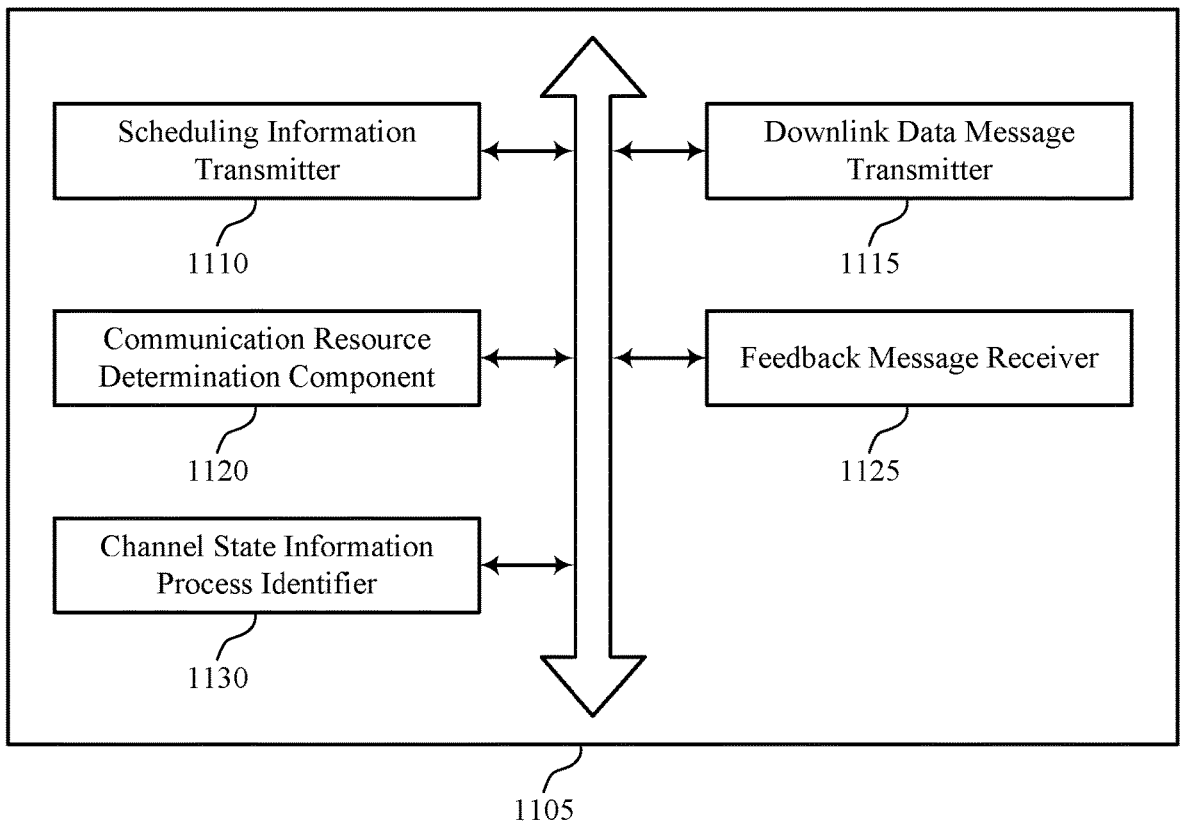
FIG. 11 shows a block diagram of a communication manager that supports handling collisions between a feedback message and uplink control information in accordance with aspects of the present disclosure.

FIG. 11 shows a block diagram 1100 of a communication manager 1105 that supports handling collisions between a feedback message and uplink control information in accordance with aspects of the present disclosure. The communication manager 1105 may be an example of aspects of a communication manager 915, a communication manager 1015, or a communication manager 1210 described herein. The communication manager 1105 may include a scheduling information transmitter 1110, a downlink data message transmitter 1115, a communication resource determination component 1120, a feedback message receiver 1125, and a channel state information process identifier 1130. Each of these modules may communicate, directly or indirectly, with one another (e.g., via one or more buses).

The scheduling information transmitter 1110 may transmit scheduling information for transmitting uplink control information in a first resource, where the first resource spans at least portions of a set of transmission time intervals.

The downlink data message transmitter 1115 may transmit a downlink data message to be acknowledged via a feedback message in a second resource, where the second resource is within one of the set of transmission time intervals. In some examples, the first uplink channel resource set may include a set of uplink channel resources, where the scheduling information transmitter 1110 transmitting the scheduling information may involve transmitting downlink control information that includes the scheduling information and an indication of the second resource. In some examples, the downlink data message transmitter 1115 transmitting the downlink control information may involve including, in the downlink control information, a parameter indicating that the communication resource is to be selected from among the set of uplink channel resources, and where receiving the multiplexed feedback message and uplink control information via the communication resource is based on the parameter. In some cases, the uplink control information includes a channel state information message, a scheduling request, or both.

The communication resource determination component 1120 may determine a communication resource for reception of the feedback message based on the first resource overlapping the second resource, the first resource spanning at least portions of the set of transmission time intervals, and the second resource being within one of the set of transmission time intervals. In some examples, the communication resource determination component 1120 determining the communication resource may involve identifying the communication resource from a first uplink channel resource set, where the first uplink channel resource set is for receiving the feedback message when the feedback message is multiplexed with the uplink control information and is different from a second uplink channel resource set which is for receiving the feedback message without the feedback message being multiplexed with the uplink control information. In some examples, the communication resource determination component 1120 may identify the communication resource based on a size of the feedback message and a size of the uplink control information.

In some examples, the communication resource determination component 1120 may identify that the communication resource is an uplink control channel resource configured for receiving the feedback message multiplexed with a first channel state information report and a second channel state information report. In some examples, the communication resource determination component 1120 determining the communication resource may involve identifying the communication resource from an uplink channel resource set, where each uplink channel resource of the uplink channel resource set has a duration equal to or less than the transmission time interval. In some examples, the one or more uplink channel resources of the first uplink channel resource set span at least portions of a respective set of transmission time intervals, and each uplink channel resource of the second uplink channel resource set is within a single transmission time interval. In some cases, the communication resource includes the first resource. In some examples, the communication resource may span at least portions of a second set of transmission time intervals.

The feedback message receiver 1125 may receive the feedback message via the communication resource. In some examples, the feedback message receiver 1125 receiving the feedback message may involve receiving the feedback message multiplexed with the uplink control information. In some examples, the feedback message receiver 1125 receiving the feedback message via the communication resource may involve receiving, on the communication resource, the feedback message multiplexed with a scheduling request of the uplink control information. In some examples, the feedback message receiver 1125 may receive the feedback message via the communication resource without a channel state information report of the uplink control information. In some examples, the feedback message receiver 1125 may receive a first set of channel state information messages multiplexed with the feedback message, where the feedback message is not multiplexed with a second set of channel state information messages.

The channel state information process identifier 1130 may identify a first set of channel state information processes for which to receive a first set of channel state information messages over the second resource and a second set of channel state information processes for which to receive a second set of channel state information messages over the second resource.

Figure 12:
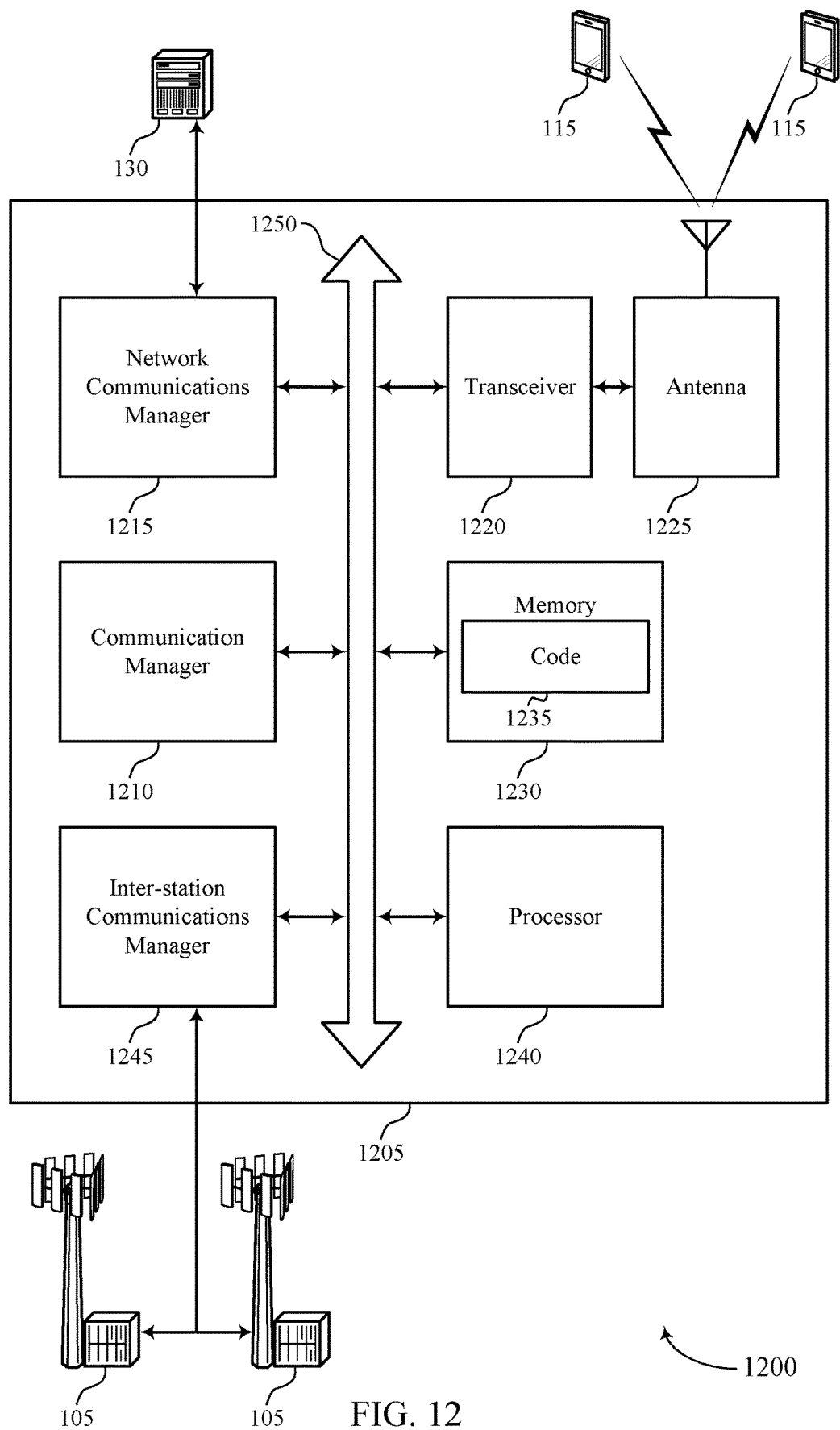
FIG. 12 shows a diagram of a system including a device that supports handling collisions between a feedback message and uplink control information in accordance with aspects of the present disclosure.

FIG. 12 shows a diagram of a system 1200 including a device 1205 that supports handling collisions between a feedback message and uplink control information in accordance with aspects of the present disclosure. The device 1205 may be an example of or include the components of device 905, device 1005, or a base station 105 as described herein. The device 1205 may include components for bi-directional voice and data communications including components for transmitting and receiving communications, including a communication manager 1210, a network communications manager 1215, a transceiver 1220, an antenna 1225, memory 1230, a processor 1240, and an inter-station communications manager 1245. These components may be in electronic communication via one or more buses (e.g., bus 1250).

The communication manager 1210 may transmit scheduling information for transmitting uplink control information in a first resource, where the first resource spans at least portions of a set of transmission time intervals; transmit a downlink data message to be acknowledged via a feedback message in a second resource, where the second resource is within one of the set of transmission time intervals; determine a communication resource for reception of the feedback message based on the first resource overlapping the second resource, the first resource spanning at least portions of the set of transmission time intervals, and the second resource being within one of the set of transmission time intervals; and receive the feedback message via the communication resource.

The network communications manager 1215 may manage communications with the core network (e.g., via one or more wired backhaul links). For example, the network communications manager 1215 may manage the transfer of data communications for client devices, such as one or more UEs 115.

The transceiver 1220 may communicate bi-directionally, via one or more antennas, wired, or wireless links as described above. For example, the transceiver 1220 may represent a wireless transceiver and may communicate bi-directionally with another wireless transceiver. The transceiver 1220 may also include a modem to modulate the packets and provide the modulated packets to the antennas for transmission, and to demodulate packets received from the antennas.

In some cases, the wireless device may include a single antenna 1225. However, in some cases the device may have more than one antenna 1225, which may be capable of concurrently transmitting or receiving multiple wireless transmissions.

The memory 1230 may include RAM and ROM. The memory 1230 may store computer-readable, computer-executable code 1235 including instructions that, when executed, cause the processor to perform various functions described herein. In some cases, the memory 1230 may contain, among other things, a BIOS which may control basic hardware or software operation such as the interaction with peripheral components or devices.

The code 1235 may include instructions to implement aspects of the present disclosure, including instructions to support wireless communications. The code 1235 may be stored in a non-transitory computer-readable medium such as system memory or other type of memory. In some cases, the code 1235 may not be directly executable by the processor 1240 but may cause a computer (e.g., when compiled and executed) to perform functions described herein.

The processor 1240 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting handling collisions between a feedback message and uplink control information).

The inter-station communications manager 1245 may manage communications with other base station 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communication network technology to provide communication between base stations 105.

By including or configuring the communication manager 1215 in accordance with examples as described herein, the device 1205 may support techniques for the device 1205 to receive feedback messages with payload sizes larger than that which resources of a single transmission time interval may carry. Accordingly, the feedback message may convey both the uplink control information and the feedback of the feedback message. Being able to receive both the uplink control information and the feedback may increase the efficiency of communication between the device 1205 and another device with which the device 1205 communicates.

Figure 13:
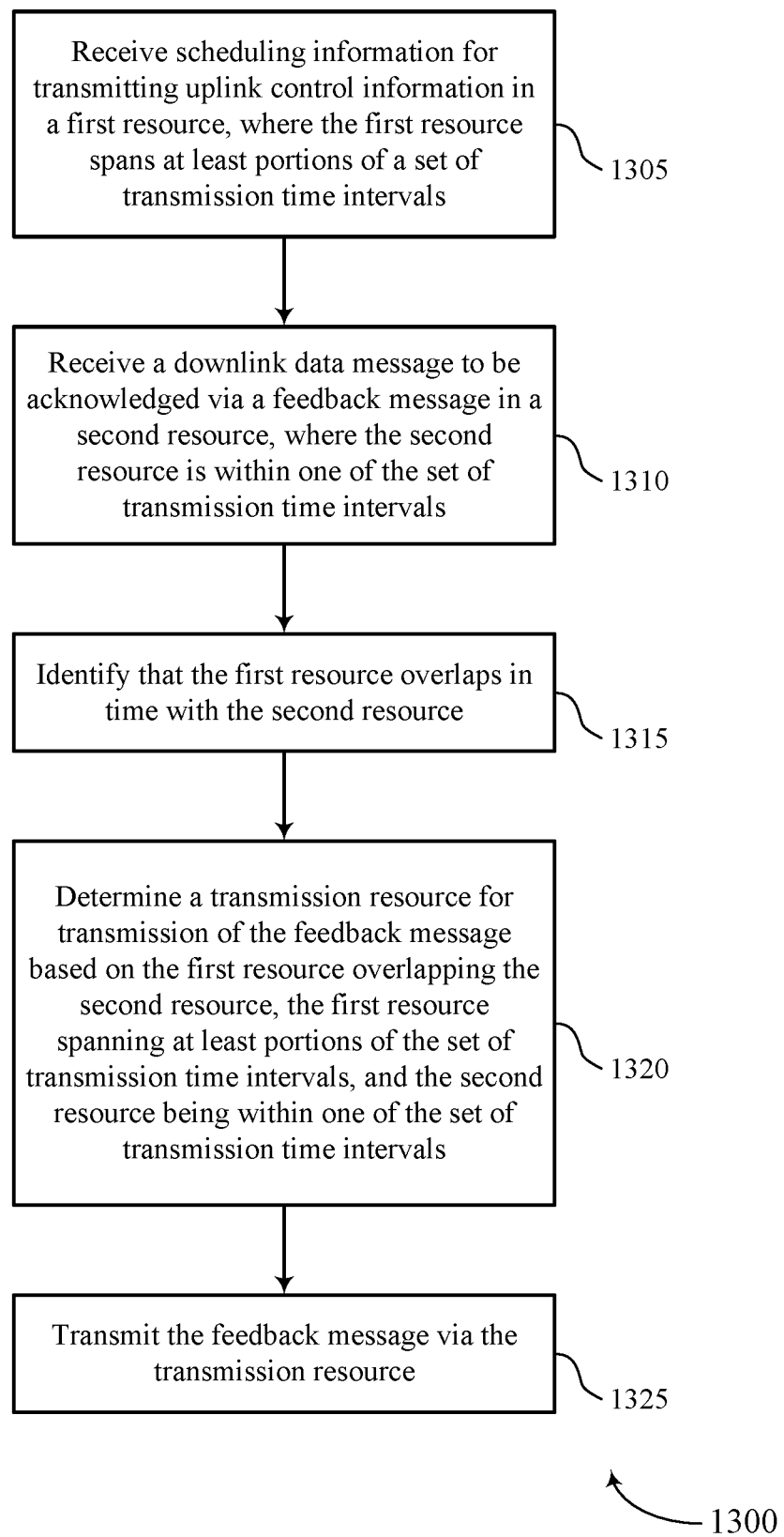
FIGS. 13 through 16 show flowcharts illustrating methods that support handling collisions between a feedback message and uplink control information in accordance with aspects of the present disclosure.

FIG. 13 shows a flowchart illustrating a method 1300 that supports handling collisions between a feedback message and uplink control information in accordance with aspects of the present disclosure. The operations of method 1300 may be implemented by a UE 115 or its components as described herein. For example, the operations of method 1300 may be performed by a communication manager as described with reference to FIGS. 5 through 8. In some examples, a UE may execute a set of instructions to control the functional elements of the UE to perform the described functions. Additionally or alternatively, a UE may perform aspects of the described functions using special-purpose hardware.

At 1305, the UE may receive scheduling information for transmitting uplink control information in a first resource, where the first resource spans at least portions of a set of transmission time intervals. The operations of 1305 may be performed according to the methods described herein. In some examples, aspects of the operations of 1305 may be performed by a scheduling information receiver as described with reference to FIGS. 5 through 8.

At 1310, the UE may receive a downlink data message to be acknowledged via a feedback message in a second resource, where the second resource is within one of the set of transmission time intervals. The operations of 1310 may be performed according to the methods described herein. In some examples, aspects of the operations of 1310 may be performed by a downlink data message receiver as described with reference to FIGS. 5 through 8.

At 1315, the UE may identify that the first resource overlaps in time with the second resource. The operations of 1315 may be performed according to the methods described herein. In some examples, aspects of the operations of 1315 may be performed by a resource overlap identifier as described with reference to FIGS. 5 through 8.

At 1320, the UE may determine a transmission resource for transmission of the feedback message based on the first resource overlapping the second resource, the first resource spanning at least portions of the set of transmission time intervals, and the second resource being within one of the set of transmission time intervals. The operations of 1320 may be performed according to the methods described herein. In some examples, aspects of the operations of 1320 may be performed by a transmission resource determination component as described with reference to FIGS. 5 through 8.

At 1325, the UE may transmit the feedback message via the transmission resource. The operations of 1325 may be performed according to the methods described herein. In some examples, aspects of the operations of 1325 may be performed by a feedback message transmitter as described with reference to FIGS. 5 through 8.

Figure 14:
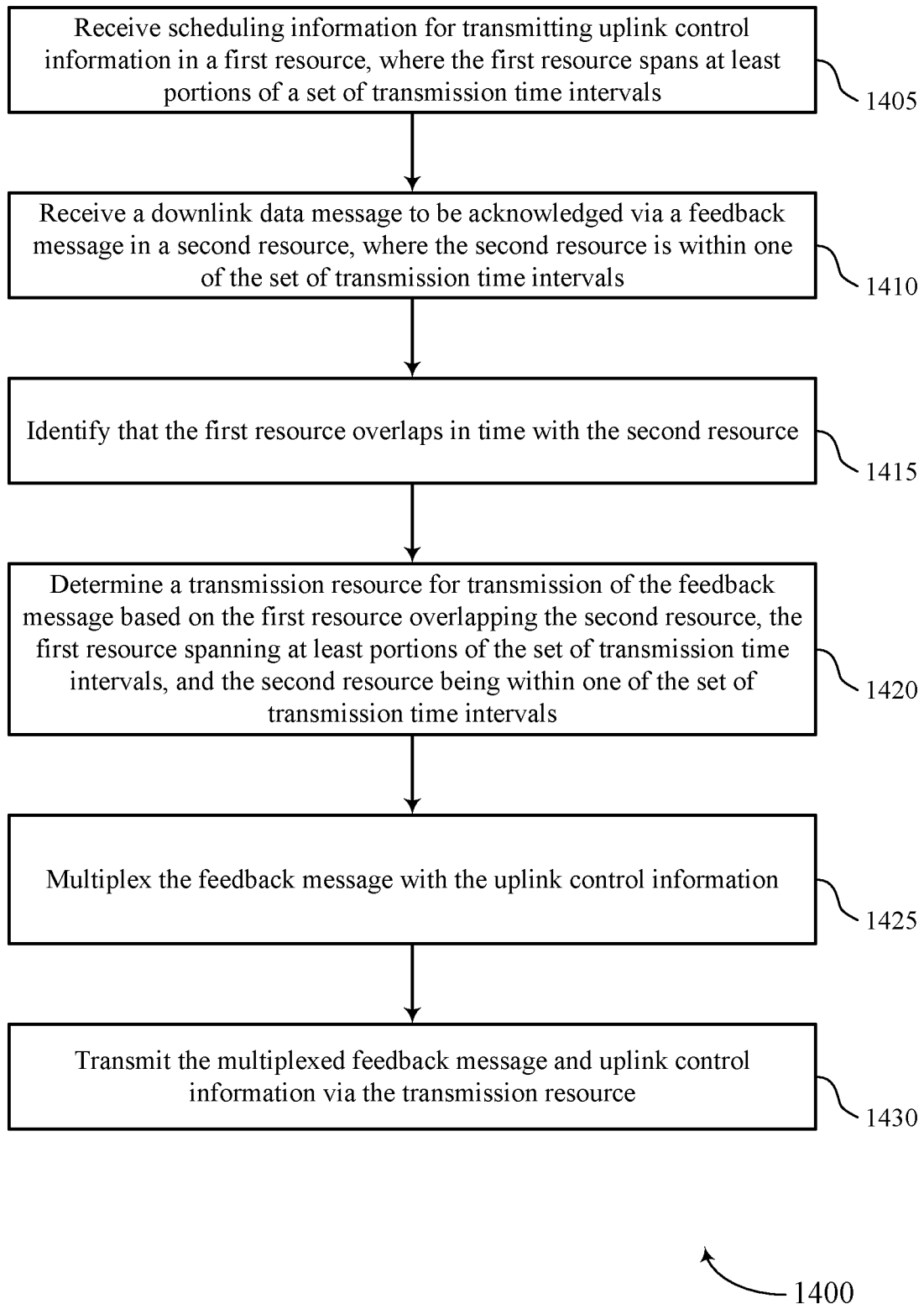

FIG. 14 shows a flowchart illustrating a method 1400 that supports handling collisions between a feedback message and uplink control information in accordance with aspects of the present disclosure. The operations of method 1400 may be implemented by a UE 115 or its components as described herein. For example, the operations of method 1400 may be performed by a communication manager as described with reference to FIGS. 5 through 8. In some examples, a UE may execute a set of instructions to control the functional elements of the UE to perform the described functions. Additionally or alternatively, a UE may perform aspects of the described functions using special-purpose hardware.

At 1405, the UE may receive scheduling information for transmitting uplink control information in a first resource, where the first resource spans at least portions of a set of transmission time intervals. The operations of 1405 may be performed according to the methods described herein. In some examples, aspects of the operations of 1405 may be performed by a scheduling information receiver as described with reference to FIGS. 5 through 8.

At 1410, the UE may receive a downlink data message to be acknowledged via a feedback message in a second resource, where the second resource is within one of the set of transmission time intervals. The operations of 1410 may be performed according to the methods described herein. In some examples, aspects of the operations of 1410 may be performed by a downlink data message receiver as described with reference to FIGS. 5 through 8.

At 1415, the UE may identify that the first resource overlaps in time with the second resource. The operations of 1415 may be performed according to the methods described herein. In some examples, aspects of the operations of 1415 may be performed by a resource overlap identifier as described with reference to FIGS. 5 through 8.

At 1420, the UE may determine a transmission resource for transmission of the feedback message based on the first resource overlapping the second resource, the first resource spanning at least portions of the set of transmission time intervals, and the second resource being within one of the set of transmission time intervals. The operations of 1420 may be performed according to the methods described herein. In some examples, aspects of the operations of 1420 may be performed by a transmission resource determination component as described with reference to FIGS. 5 through 8.

At 1425, the UE may multiplex the feedback message with the uplink control information. The operations of 1425 may be performed according to the methods described herein. In some examples, aspects of the operations of 1425 may be performed by a multiplexing component as described with reference to FIGS. 5 through 8.

At 1430, the UE may transmit the multiplexed feedback message and uplink control information via the transmission resource. The operations of 1430 may be performed according to the methods described herein. In some examples, aspects of the operations of 1430 may be performed by a feedback message transmitter as described with reference to FIGS. 5 through 8.

Figure 15:
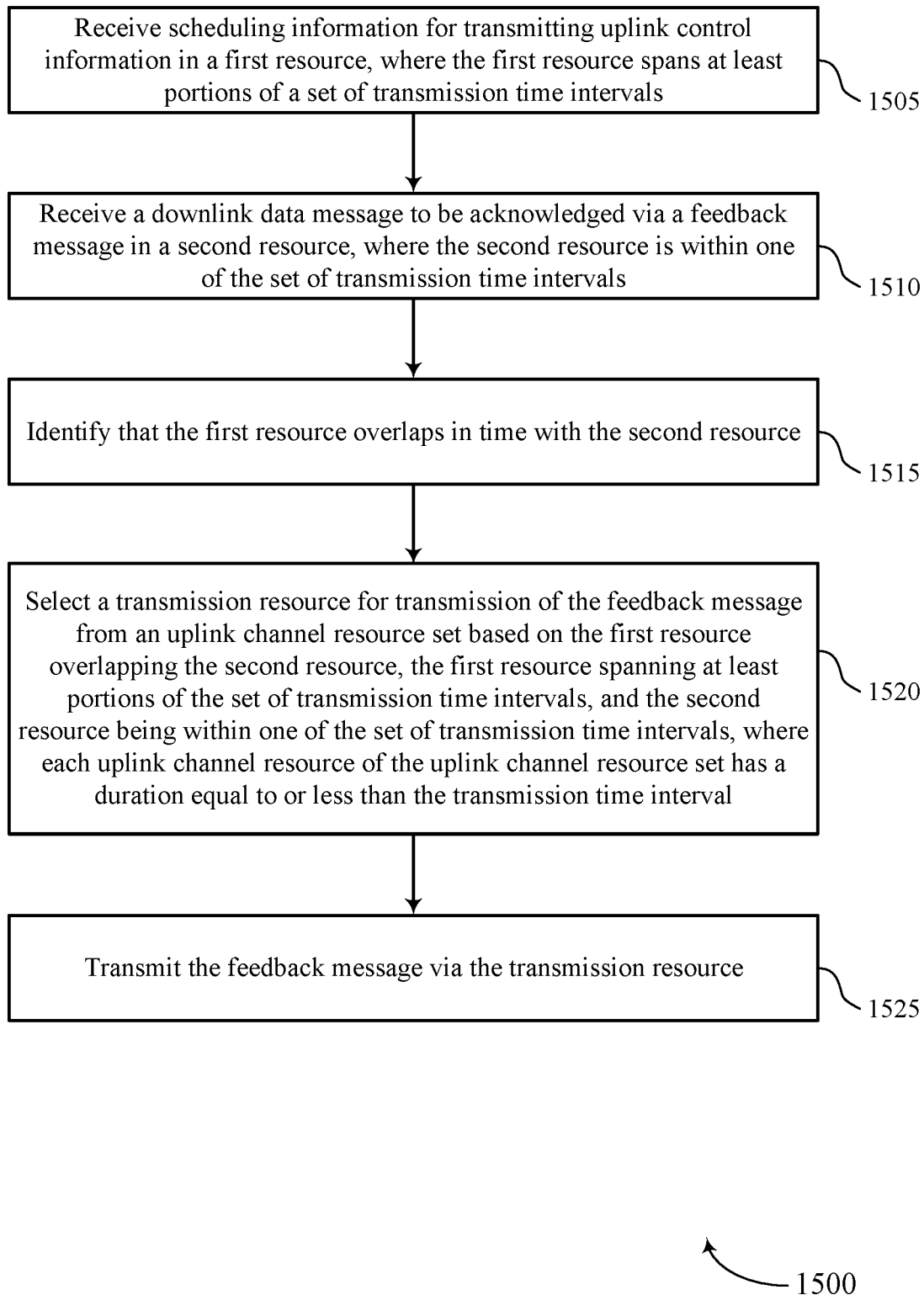

FIG. 15 shows a flowchart illustrating a method 1500 that supports handling collisions between a feedback message and uplink control information in accordance with aspects of the present disclosure. The operations of method 1500 may be implemented by a UE 115 or its components as described herein. For example, the operations of method 1500 may be performed by a communication manager as described with reference to FIGS. 5 through 8. In some examples, a UE may execute a set of instructions to control the functional elements of the UE to perform the described functions. Additionally or alternatively, a UE may perform aspects of the described functions using special-purpose hardware.

At 1505, the UE may receive scheduling information for transmitting uplink control information in a first resource, where the first resource spans at least portions of a set of transmission time intervals. The operations of 1505 may be performed according to the methods described herein. In some examples, aspects of the operations of 1505 may be performed by a scheduling information receiver as described with reference to FIGS. 5 through 8.

At 1510, the UE may receive a downlink data message to be acknowledged via a feedback message in a second resource, where the second resource is within one of the set of transmission time intervals. The operations of 1510 may be performed according to the methods described herein. In some examples, aspects of the operations of 1510 may be performed by a downlink data message receiver as described with reference to FIGS. 5 through 8.

At 1515, the UE may identify that the first resource overlaps in time with the second resource. The operations of 1515 may be performed according to the methods described herein. In some examples, aspects of the operations of 1515 may be performed by a resource overlap identifier as described with reference to FIGS. 5 through 8.

At 1520, the UE may select a transmission resource for transmission of the feedback message from an uplink channel resource set based on the first resource overlapping the second resource, the first resource spanning at least portions of the set of transmission time intervals, and the second resource being within one of the set of transmission time intervals, where each uplink channel resource of the uplink channel resource set has a duration equal to or less than the transmission time interval. The operations of 1520 may be performed according to the methods described herein. In some examples, aspects of the operations of 1520 may be performed by a transmission resource determination component as described with reference to FIGS. 5 through 8.

At 1525, the UE may transmit the feedback message via the transmission resource. The operations of 1525 may be performed according to the methods described herein. In some examples, aspects of the operations of 1525 may be performed by a feedback message transmitter as described with reference to FIGS. 5 through 8.

Figure 16:
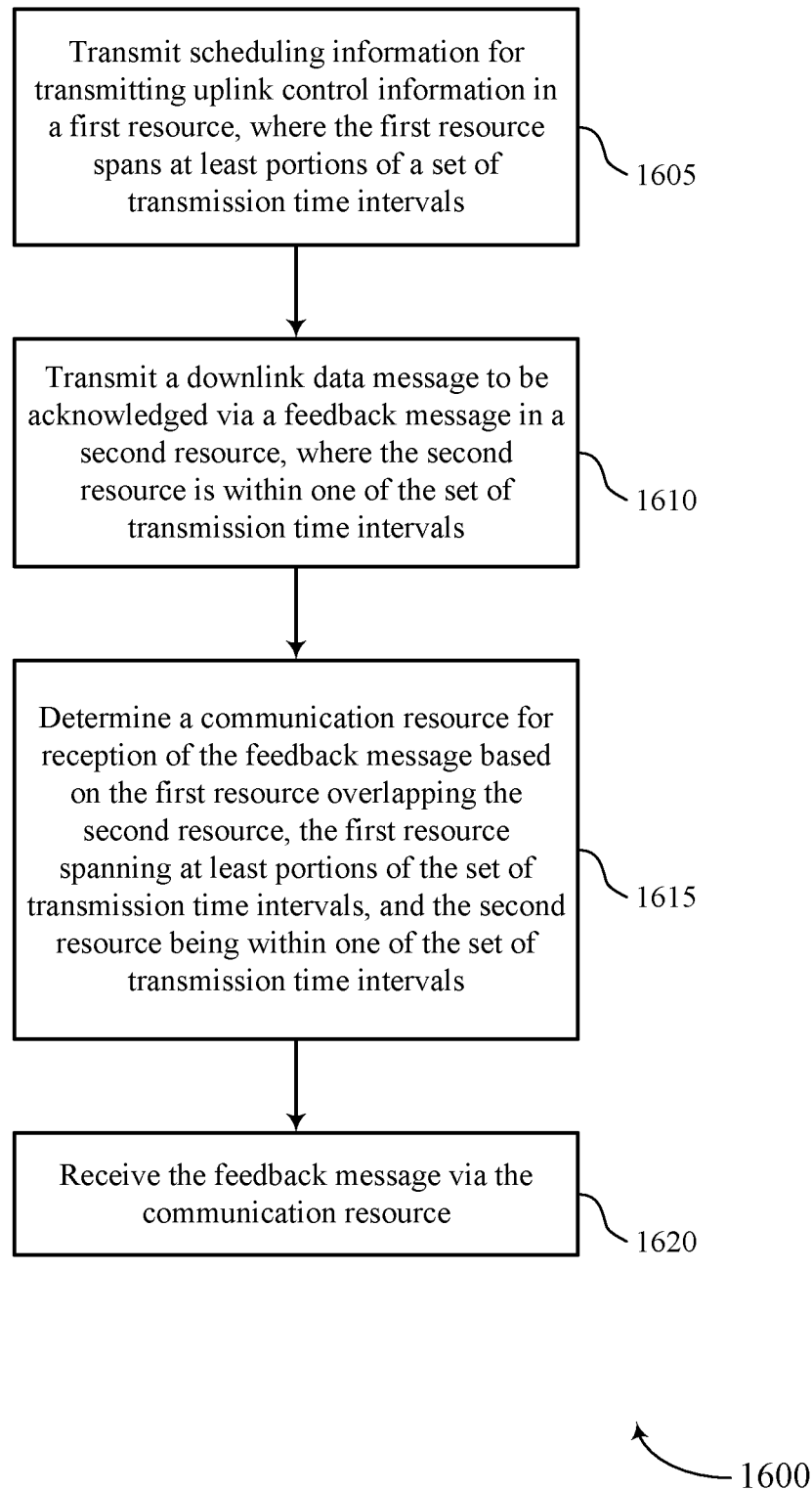

FIG. 16 shows a flowchart illustrating a method 1600 that supports handling collisions between a feedback message and uplink control information in accordance with aspects of the present disclosure. The operations of method 1600 may be implemented by a base station 105 or its components as described herein. For example, the operations of method 1600 may be performed by a communication manager as described with reference to FIGS. 9 through 12. In some examples, a base station may execute a set of instructions to control the functional elements of the base station to perform the described functions. Additionally or alternatively, a base station may perform aspects of the described functions using special-purpose hardware.

At 1605, the base station may transmit scheduling information for transmitting uplink control information in a first resource, where the first resource spans at least portions of a set of transmission time intervals. The operations of 1605 may be performed according to the methods described herein. In some examples, aspects of the operations of 1605 may be performed by a scheduling information transmitter as described with reference to FIGS. 9 through 12.

At 1610, the base station may transmit a downlink data message to be acknowledged via a feedback message in a second resource, where the second resource is within one of the set of transmission time intervals. The operations of 1610 may be performed according to the methods described herein. In some examples, aspects of the operations of 1610 may be performed by a downlink data message transmitter as described with reference to FIGS. 9 through 12.

At 1615, the base station may determine a communication resource for reception of the feedback message based on the first resource overlapping the second resource, the first resource spanning at least portions of the set of transmission time intervals, and the second resource being within one of the set of transmission time intervals. The operations of 1615 may be performed according to the methods described herein. In some examples, aspects of the operations of 1615 may be performed by a communication resource determination component as described with reference to FIGS. 9 through 12.

At 1620, the base station may receive the feedback message via the communication resource. The operations of 1620 may be performed according to the methods described herein. In some examples, aspects of the operations of 1620 may be performed by a feedback message receiver as described with reference to FIGS. 9 through 12.

The following provides an overview of aspects of the present disclosure:

Aspect 1: A method for wireless communication, comprising: receiving scheduling information for transmitting uplink control information in a first resource, wherein the first resource spans at least portions of a plurality of transmission time intervals; receiving a downlink data message to be acknowledged via a feedback message in a second resource, wherein the second resource is within one of the plurality of transmission time intervals; identifying that the first resource overlaps in time with the second resource; determining a transmission resource for transmission of the feedback message based at least in part on the first resource overlapping the second resource, the first resource spanning at least portions of the plurality of transmission time intervals, and the second resource being within one of the plurality of transmission time intervals; and transmitting the feedback message via the transmission resource.

Aspect 2: The method of aspect 1, further comprising: multiplexing the feedback message with the uplink control information, wherein transmitting the feedback message comprises transmitting the multiplexed feedback message and uplink control information via the transmission resource.

Aspect 3: The method of aspect 2, wherein determining the transmission resource comprises: identifying the transmission resource from a first uplink channel resource set, wherein the first uplink channel resource set is for transmitting the feedback message when the feedback message is multiplexed with the uplink control information and is different from a second uplink channel resource set which is for transmitting the feedback message without the feedback message being multiplexed with the uplink control information.

Aspect 4: The method of aspect 3, wherein the first uplink channel resource set comprises a plurality of uplink channel resources, wherein determining the transmission resource further comprises: selecting the transmission resource from among the plurality of uplink channel resources based at least in part on a size of the feedback message and a size of the uplink control information.

Aspect 5: The method of any of aspects 3 through 4, wherein the first uplink channel resource set comprises a plurality of uplink channel resources, and wherein receiving the scheduling information comprises receiving downlink control information that includes the scheduling information and an indication of the second resource, and wherein the downlink control information comprises a parameter indicating that the transmission resource is to be selected from among the plurality of uplink channel resources, wherein determining the transmission resource further comprises: selecting the transmission resource from among the plurality of uplink channel resources based at least in part on the parameter.

Aspect 6: The method of any of aspects 3 through 5, wherein one or more uplink channel resources of the first uplink channel resource set span at least portions of a respective plurality of transmission time intervals, and each uplink channel resource of the second uplink channel resource set is within a single transmission time interval.

Aspect 7: The method of any of aspects 2 through 6, wherein determining the transmission resource further comprises: selecting the first resource as the transmission resource.

Aspect 8: The method of any of aspects 2 through 7, wherein determining the transmission resource further comprises: identifying that the transmission resource is an uplink control channel resource configured for transmitting a first channel state information report multiplexed with a second channel state information report.

Aspect 9: The method of any of aspects 2 through 8, wherein the transmission resource spans at least portions of a second plurality of transmission time intervals.

Aspect 10: The method of any of aspects 1 through 9, wherein determining the transmission resource further comprises: selecting the transmission resource from an uplink channel resource set, wherein each uplink channel resource of the uplink channel resource set has a duration equal to or less than a respective transmission time interval.

Aspect 11: The method of aspect 10, further comprising: multiplexing, on the transmission resource, the feedback message with a scheduling request of the uplink control information.

Aspect 12: The method of any of aspects 10 through 11, further comprising: refraining from including a channel state information report of the uplink control information with the feedback message on the transmission resource.

Aspect 13: The method of any of aspects 10 through 12, wherein the uplink control information comprises a channel state information report available for transmission, and further comprising: identifying a first subset and a second subset of the channel state information report; multiplexing the first subset with the feedback message, wherein transmitting the feedback message comprises transmitting the multiplexed first subset and feedback message via the transmission resource; and refraining from transmitting the second subset based at least in part on each uplink channel resource of the uplink channel resource set being within the respective transmission time interval.

Aspect 14: The method of any of aspects 1 through 13, wherein the uplink control information comprises a channel state information report, a scheduling request, or both.

Aspect 15: A method for wireless communication, comprising: transmitting scheduling information for transmitting uplink control information in a first resource, wherein the first resource spans at least portions of a plurality of transmission time intervals; transmitting a downlink data message to be acknowledged via a feedback message in a second resource, wherein the second resource is within one of the plurality of transmission time intervals; determining a communication resource for reception of the feedback message based at least in part on the first resource overlapping the second resource, the first resource spanning at least portions of the plurality of transmission time intervals, and the second resource being within one of the plurality of transmission time intervals; and receiving the feedback message via the communication resource.

Aspect 16: The method of aspect 15, wherein receiving the feedback message comprises: receiving the feedback message multiplexed with the uplink control information.

Aspect 17: The method of aspect 16, wherein determining the communication resource comprises: identifying the communication resource from a first uplink channel resource set, wherein the first uplink channel resource set is for receiving the feedback message when the feedback message is multiplexed with the uplink control information and is different from a second uplink channel resource set which is for receiving the feedback message without the feedback message being multiplexed with the uplink control information.

Aspect 18: The method of aspect 17, further comprising: identifying the communication resource based at least in part on a size of the feedback message and a size of the uplink control information.

Aspect 19: The method of any of aspects 17 through 18, wherein the first uplink channel resource set comprises a plurality of uplink channel resources, and wherein transmitting the scheduling information comprises transmitting downlink control information that includes the scheduling information and an indication of the second resource, and wherein transmitting the downlink control information further comprises: including, in the downlink control information, a parameter indicating that the communication resource is to be selected from among the plurality of uplink channel resources, and wherein receiving the multiplexed feedback message and uplink control information via the communication resource is based at least in part on the parameter.

Aspect 20: The method of any of aspects 17 through 19, wherein one or more uplink channel resources of the first uplink channel resource set span at least portions of a respective plurality of transmission time intervals, and each uplink channel resource of the second uplink channel resource set is within a single transmission time interval.

Aspect 21: The method of any of aspects 16 through 20, wherein the communication resource comprises the first resource.

Aspect 22: The method of any of aspects 16 through 21, further comprising: identifying that the communication resource is an uplink control channel resource configured for receiving the feedback message multiplexed with a first channel state information report and a second channel state information report.

Aspect 23: The method of any of aspects 16 through 22, wherein the communication resource spans at least portions of a second plurality of transmission time intervals.

Aspect 24: The method of any of aspects 16 through 23, wherein determining the communication resource further comprises: identifying the communication resource from an uplink channel resource set, wherein each uplink channel resource of the uplink channel resource set has a duration equal to or less than a respective transmission time interval.

Aspect 25: The method of aspect 24, wherein receiving the feedback message via the communication resource comprises: receiving, on the communication resource, the feedback message multiplexed with a scheduling request of the uplink control information.

Aspect 26: The method of any of aspects 24 through 25, wherein receiving the feedback message via the communication resource comprises: receiving the feedback message via the communication resource without a channel state information report of the uplink control information.

Aspect 27: The method of any of aspects 24 through 26, further comprising: identifying a first set of channel state information processes for which to receive a first set of channel state information messages over the second resource and a second set of channel state information processes for which to receive a second set of channel state information messages over the second resource; and receiving the first set of channel state information messages multiplexed with the feedback message, wherein the feedback message is not multiplexed with the second set of channel state information messages.

Aspect 28: The method of any of aspects 15 through 27, wherein the uplink control information comprises a channel state information message, a scheduling request, or both.

Aspect 29: An apparatus for wireless communication, comprising a processor; memory coupled with the processor; and instructions stored in the memory and executable by the processor to cause the apparatus to perform a method of any of aspects 1 through 14.

Aspect 30: An apparatus for wireless communication, comprising at least one means for performing a method of any of aspects 1 through 14.

Aspect 31: A non-transitory computer-readable medium storing code for wireless communication, the code comprising instructions executable by a processor to perform a method of any of aspects 1 through 14.

Aspect 32: An apparatus for wireless communication, comprising a processor; memory coupled with the processor; and instructions stored in the memory and executable by the processor to cause the apparatus to perform a method of any of aspects 15 through 28.

Aspect 33: An apparatus for wireless communication, comprising at least one means for performing a method of any of aspects 15 through 28.

Aspect 34: A non-transitory computer-readable medium storing code for wireless communication, the code comprising instructions executable by a processor to perform a method of any of aspects 15 through 28.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A first network node for wireless communication, comprising:
at least one processor, and
memory in electronic communication with the at least one processor, wherein the first network node is configured to:
receive a downlink control information message that comprises scheduling information for transmission of uplink control information in a first resource, wherein the first resource spans a slot;
identify a plurality of slot-based uplink channel resource sets and a plurality of subslot-based uplink channel resource sets each configured for a feedback message;
receive a downlink data message to be acknowledged via the feedback message in a second resource, wherein the second resource spans a sub-slot;
select an uplink channel resource set from the plurality of slot-based uplink channel resource sets based on a size of the feedback message and a size of the uplink control information, wherein each subslot-based uplink channel resource set of the plurality of subslot-based uplink channel resource sets is excluded from selection based on receipt of the downlink control information message; and
transmit the feedback message via a transmission resource, wherein the transmission resource is from the uplink channel resource set and is based on the downlink control information message, on the first resource overlapping the second resource, on the first resource spanning the slot, and on the second resource spanning the sub-slot.

2. The first network node of claim 1, wherein the first network node is further configured to:
multiplex the feedback message with the uplink control information, wherein, to transmit the feedback message, the first network node is configured to transmit the multiplexed feedback message and the uplink control information via the transmission resource.

3. The first network node of claim 2,
wherein the uplink channel resource set is for transmission of the feedback message when the feedback message is multiplexed with the uplink control information and is different from a second uplink channel resource set which is for transmission of the feedback message without the uplink control information.

4. The first network node of claim 3, wherein the uplink channel resource set comprises a plurality of uplink channel resources, and wherein, to receive the scheduling information, the first network node is configured to receive the downlink control information message that includes the scheduling information and an indication of the second resource, and wherein the downlink control information message indicates that the transmission resource is to be selected from among the plurality of uplink channel resources, and wherein the first network node is further configured to:
select the transmission resource from among the plurality of uplink channel resources based at least in part on the downlink control information message.

5. The first network node of claim 3, wherein one or more uplink channel resources of the uplink channel resource set span at least portions of a respective plurality of transmission time intervals, and wherein each uplink channel resource of the second uplink channel resource set is within a single transmission time interval.

6. The first network node of claim 2, wherein the transmission resource comprises the first resource.

7. The first network node of claim 2, wherein
the transmission resource is an uplink control channel resource configured for transmission of a first channel state information report multiplexed with a second channel state information report.

8. The first network node of claim 2, wherein the transmission resource spans at least portions of a second plurality of transmission time intervals.

9. The first network node of claim 1, wherein
each uplink channel resource of the uplink channel resource set has a duration equal to or less than a respective transmission time interval.

10. The first network node of claim 9, wherein the first network node is further configured to:
multiplex, on the transmission resource, the feedback message with a scheduling request of the uplink control information.

11. The first network node of claim 9, wherein the first network node is further configured to:
refrain from inclusion of a channel state information report of the uplink control information with the feedback message on the transmission resource.

12. The first network node of claim 9, wherein the uplink control information comprises a channel state information report available for transmission, and wherein the first network node is further configured to:
multiplex a first subset of the channel state information report with the feedback message, wherein, to transmit the feedback message, the first network node is configured to transmit the multiplexed first subset and the feedback message via the transmission resource; and refrain from transmission of a second subset of the channel state information report based at least in part on the each uplink channel resource of the uplink channel resource set being within the respective transmission time interval.

13. The first network node of claim 1, wherein the uplink control information comprises a channel state information report or a scheduling request.

14. A first network node for wireless communication, comprising:
at least one processor, and
memory in electronic communication with the at least one processor, wherein the first network node is configured to:
transmit a downlink control information message that comprises scheduling information for transmission of uplink control information in a first resource, wherein the first resource spans a slot;
identify a plurality of slot-based uplink channel resource sets and a plurality of subslot-based uplink channel resource sets each configured for a feedback message;
transmit a downlink data message to be acknowledged the feedback message in a second resource, wherein the second resource spans a sub-slot;
select an uplink channel resource set from the plurality of slot-based uplink channel resource sets based on a size of the feedback message and a size of the uplink control information, wherein each subslot-based uplink channel resource set of the plurality of subslot-based uplink channel resource sets is excluded from selection based on transmission of the downlink control information message; and
receive the feedback message via a communication resource, wherein the communication resource is from the uplink channel resource set and is based on the downlink control information message, on the first resource overlapping the second resource, on the first resource spanning the slot, and on the second resource spanning the sub-slot.

15. The first network node of claim 14, wherein, to receive the feedback message, the first network node is configured to:
receive the feedback message multiplexed with the uplink control information.

16. The first network node of claim 14, wherein, to receive the feedback message via the communication resource, the first network node is configured to:
receive the feedback message via the communication resource without a channel state information report of the uplink control information.

17. A method for wireless communication performed by a first network node, comprising:
receiving a downlink control information message that comprises scheduling information for transmitting uplink control information in a first resource, wherein the first resource spans a slot;
identifying a plurality of slot-based uplink channel resource sets and a plurality of subslot-based uplink channel resource sets each configured for a feedback message;
receiving a downlink data message to be acknowledged via the feedback message in a second resource, wherein the second resource spans a sub-slot;
selecting an uplink channel resource set from the plurality of slot-based uplink channel resource sets based on a size of the feedback message and a size of the uplink control information, wherein each subslot-based uplink channel resource set of the plurality of subslot-based uplink channel resource sets is excluded from selection based on receipt of the downlink control information message; and
transmitting the feedback message via a transmission resource for transmission of the feedback message, wherein the transmission resource is from the uplink channel resource set and is based on the downlink control information message, on the first resource overlapping the second resource, on the first resource spanning the slot, and on the second resource spanning the sub-slot.

18. The method of claim 17, further comprising:
multiplexing the feedback message with the uplink control information, wherein transmitting the feedback message comprises transmitting the multiplexed feedback message and the uplink control information via the transmission resource.

19. The method of claim 18, wherein
the uplink channel resource set is for transmitting the feedback message when the feedback message is multiplexed with the uplink control information and is different from a second uplink channel resource set which is for transmitting the feedback message without the feedback message being multiplexed with the uplink control information.

20. The method of claim 18, wherein the transmission resource comprises the first resource.

21. The method of claim 18, wherein
the transmission resource is an uplink control channel resource configured for transmitting a first channel state information report multiplexed with a second channel state information report.

22. The method of claim 18, wherein the transmission resource spans at least portions of a second plurality of transmission time intervals.

23. The method of claim 17, wherein
each uplink channel resource of the uplink channel resource set has a duration equal to or less than a respective transmission time interval.

24. The method of claim 23, further comprising:
multiplexing, on the transmission resource, the feedback message with a scheduling request of the uplink control information.

25. The method of claim 23, further comprising:
refraining from including a channel state information report of the uplink control information with the feedback message on the transmission resource.

26. The method of claim 23, wherein the uplink control information comprises a channel state information report available for transmission, and further comprising:
multiplexing a first subset of the channel state information report with the feedback message, wherein transmitting the feedback message comprises transmitting the multiplexed first subset and the feedback message via the transmission resource; and
refraining from transmitting a second subset of the channel state information report based at least in part on the each uplink channel resource of the uplink channel resource set being within the respective transmission time interval.

27. A method for wireless communication performed by a first network node, comprising:
transmitting a downlink control information message that comprises scheduling information for transmitting uplink control information in a first resource, wherein the first resource spans a slot;

identifying a plurality of slot-based uplink channel resource sets and a plurality of subslot-based uplink channel resource sets each configured for a feedback message;

transmitting a downlink data message to be acknowledged via the feedback message in a second resource, wherein the second resource spans a sub-slot;

selecting an uplink channel resource set from the plurality of slot-based uplink channel resource sets based on a size of the feedback message and a size of the uplink control information, wherein each subslot-based uplink channel resource set of the plurality of subslot-based uplink channel resource sets is excluded from selection based on transmission of the downlink control information message; and receiving the feedback message via a communication resource, wherein the communication resource is from the uplink channel resource set and is based on the downlink control information message, on the first resource overlapping the second resource, on the first resource spanning the slot, and on the second resource spanning the sub-slot.

28. The method of claim 27, wherein receiving the feedback message comprises:
receiving the feedback message multiplexed with the uplink control information.

29. The method of claim 27, wherein receiving the feedback message via the communication resource comprises:
receiving the feedback message via the communication resource without a channel state information report of the uplink control information.

* * * * *